United States Patent [19]
Burr et al.

[11] Patent Number: 5,998,502
[45] Date of Patent: *Dec. 7, 1999

[54] INK JET INKS

[75] Inventors: Raymond David Burr, Surrey; Jenny Marie Bowles, Chepstow Gwent; Alan Lionel Hudd; Shaun Christopher Hazlewood, both of Herts; Naser Reza, Cambs, all of United Kingdom

[73] Assignee: Domino UK Limited, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/676,154

[22] PCT Filed: Jan. 12, 1995

[86] PCT No.: PCT/GB95/00053

§ 371 Date: Mar. 18, 1997

§ 102(e) Date: Mar. 18, 1997

[87] PCT Pub. No.: WO95/19401

PCT Pub. Date: Jul. 20, 1995

[30]     Foreign Application Priority Data

Jan. 12, 1994 [GB] United Kingdom ................... 9400517

[51] Int. Cl.⁶ ...................................................... C09D 5/00
[52] U.S. Cl. ............................................................. 523/161
[58] Field of Search ............................................... 523/161

[56]                 References Cited

U.S. PATENT DOCUMENTS

| | | | |
|---|---|---|---|
| 3,253,940 | 5/1966 | Floyd | 106/316 |
| 3,597,376 | 8/1971 | Tashiro | 260/18 N |

FOREIGN PATENT DOCUMENTS

| | | |
|---|---|---|
| 0113002 | 11/1983 | European Pat. Off. . |
| 113002 | 11/1983 | European Pat. Off. . |
| 0368315 | 5/1990 | European Pat. Off. . |
| 368315 | 5/1990 | European Pat. Off. . |

*Primary Examiner*—Edward J. Cain
*Attorney, Agent, or Firm*—Robert FaI Conte; Lee, Mann, Smith, McWilliams, Sweeney & Ohlson

[57]                 ABSTRACT

Inks for continuous ink jet printer, containing polyamide resins as binders and wherein the polyamide resins are characterized by having a glass transition onset temperature of 95° to 175° and preferably 120° to 140°.

16 Claims, 23 Drawing Sheets

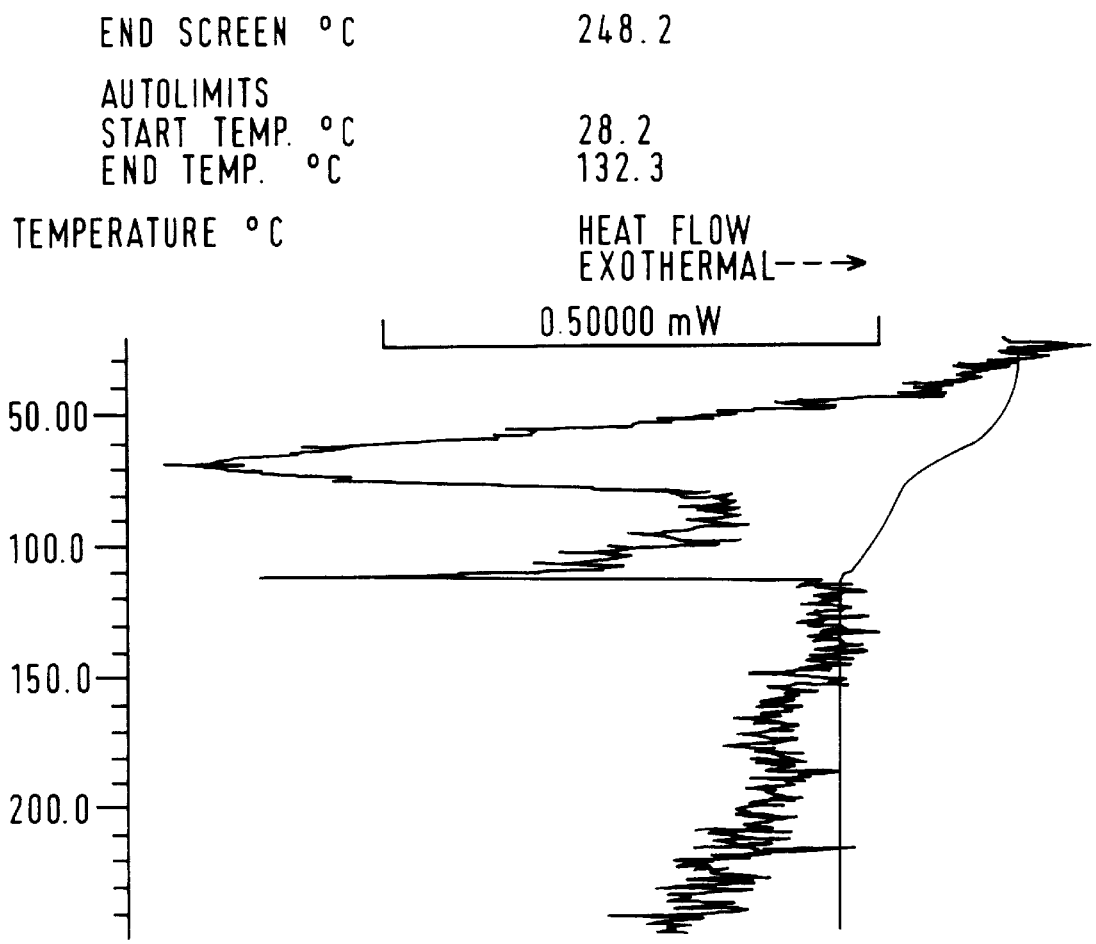
FIG. 1A1.

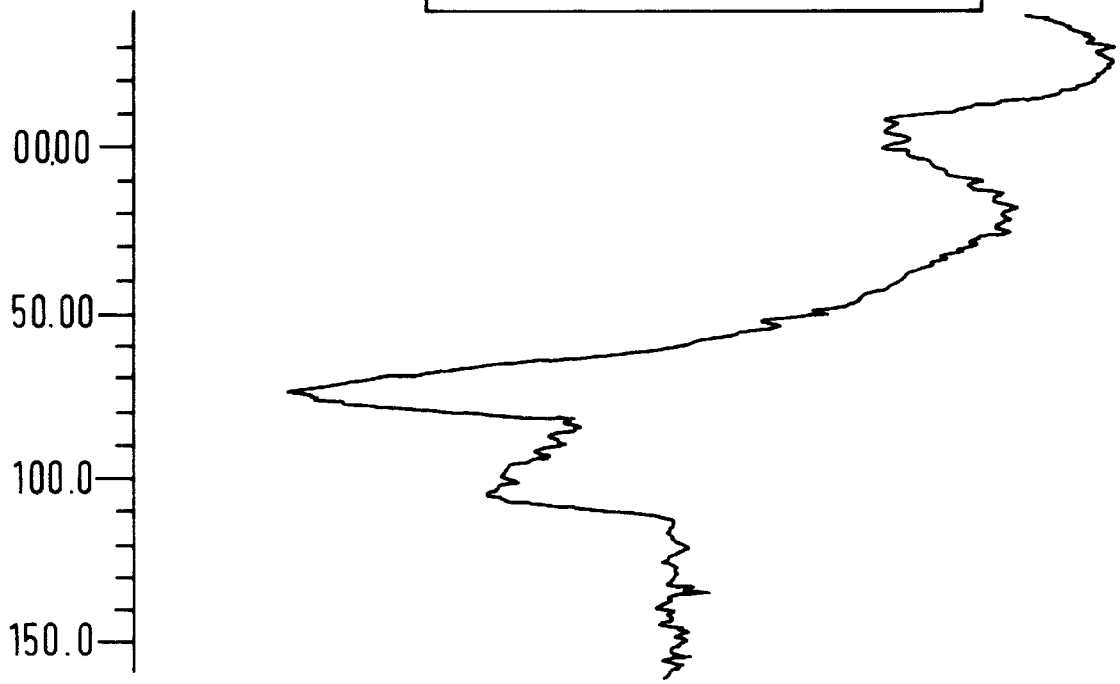
FIG. 1A2.

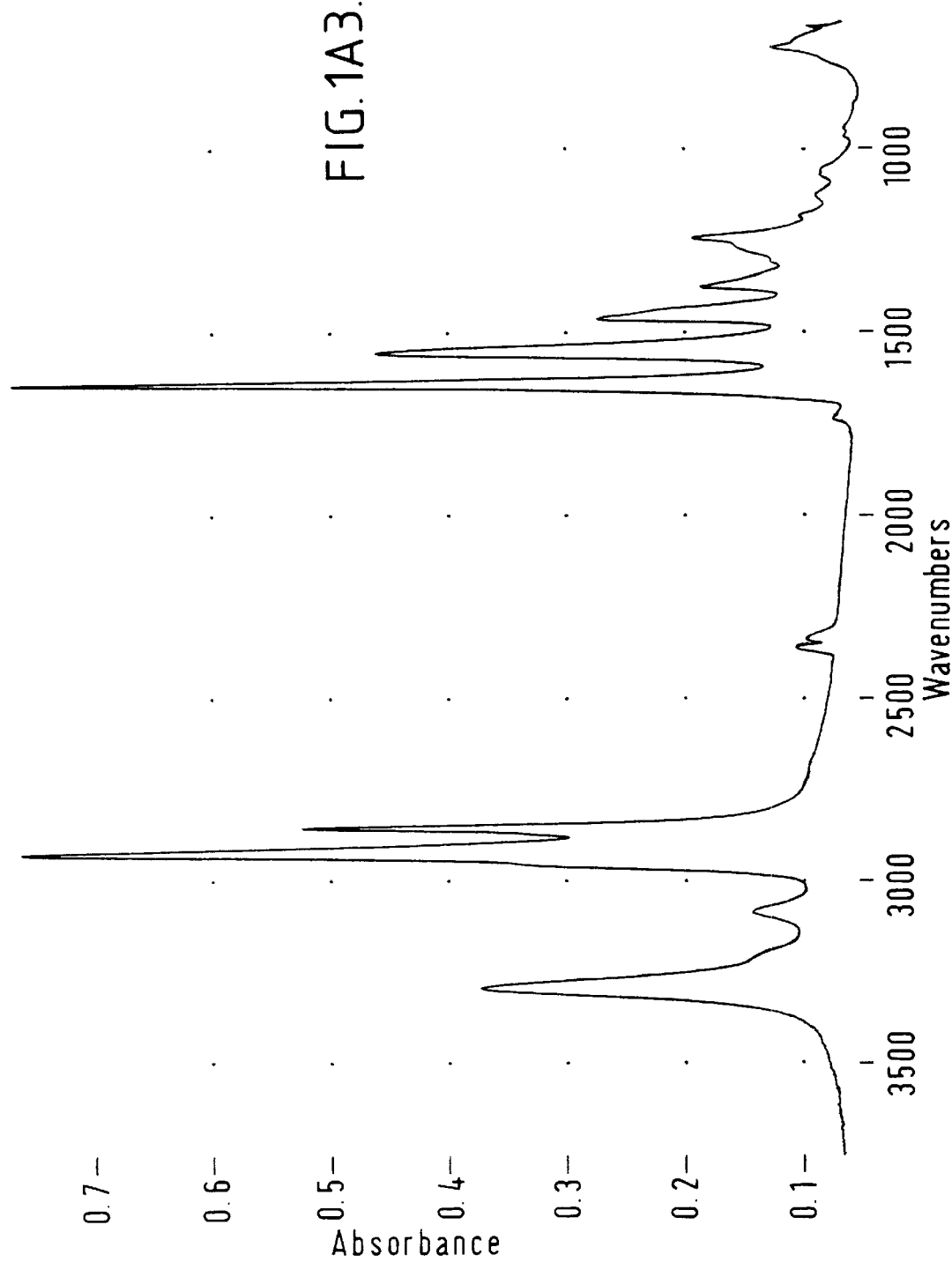
FIG. 1A3.

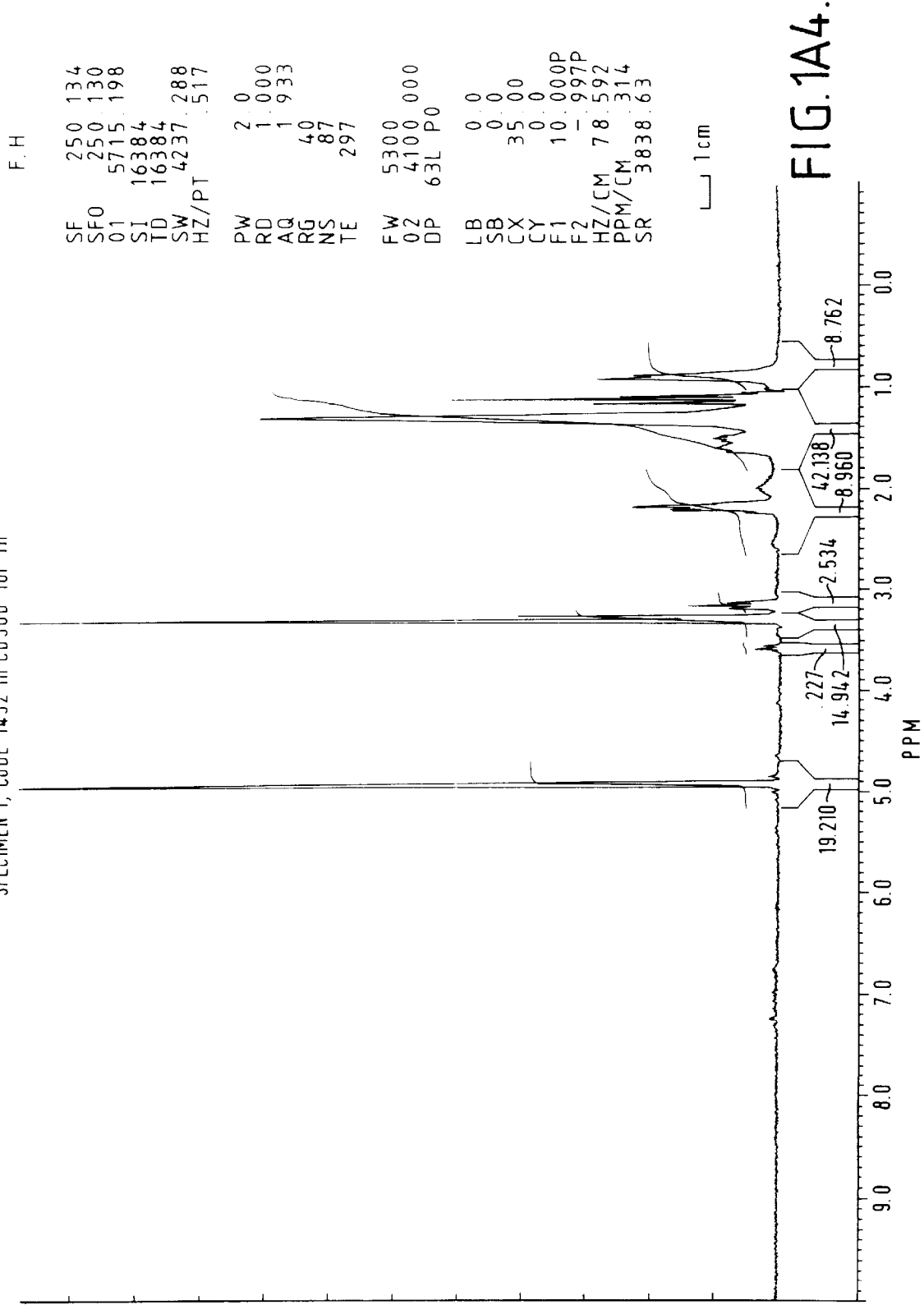
FIG.1A4.

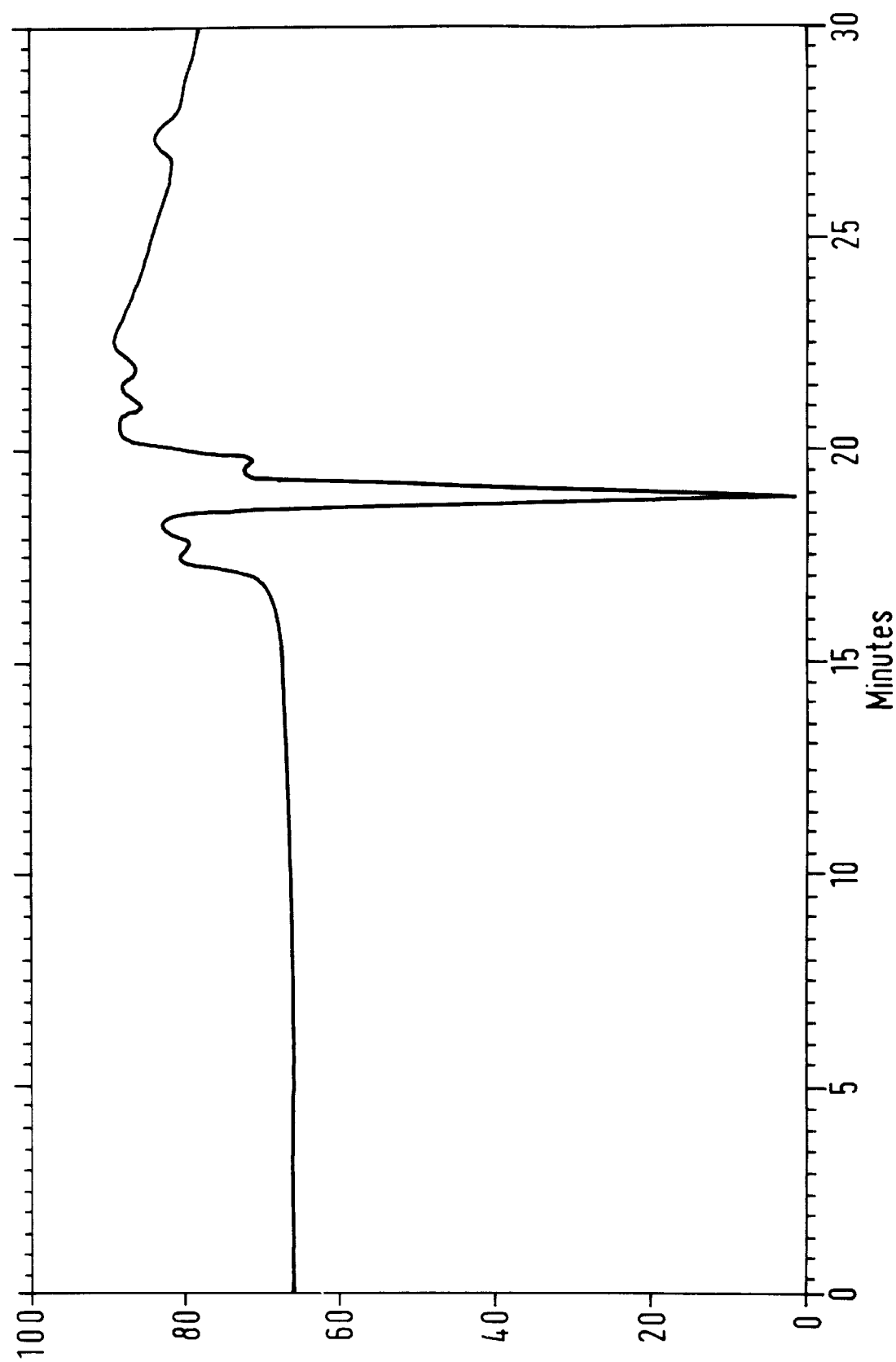
FIG. 1A5.

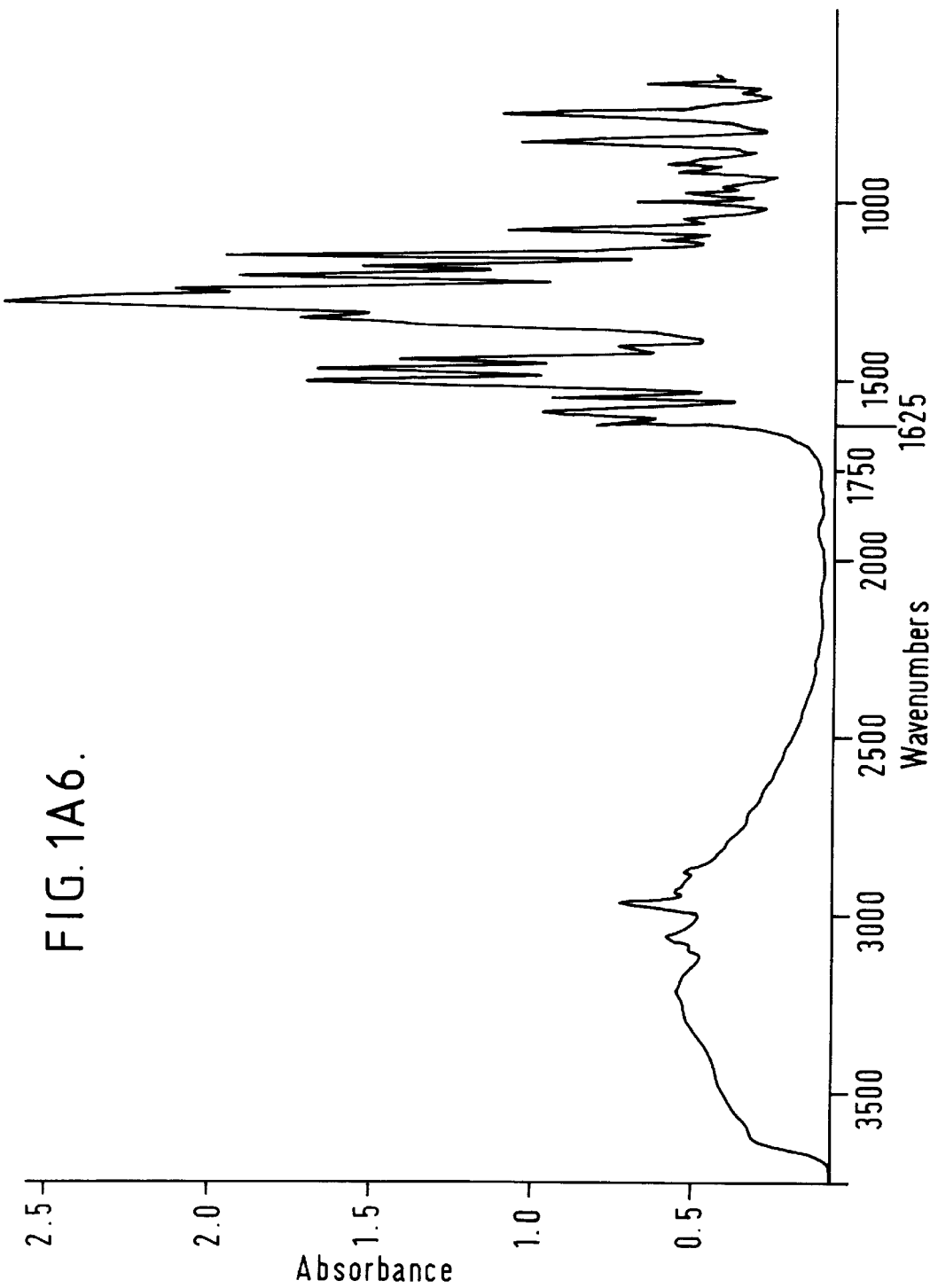
FIG. 1A6.

Figure 1B:
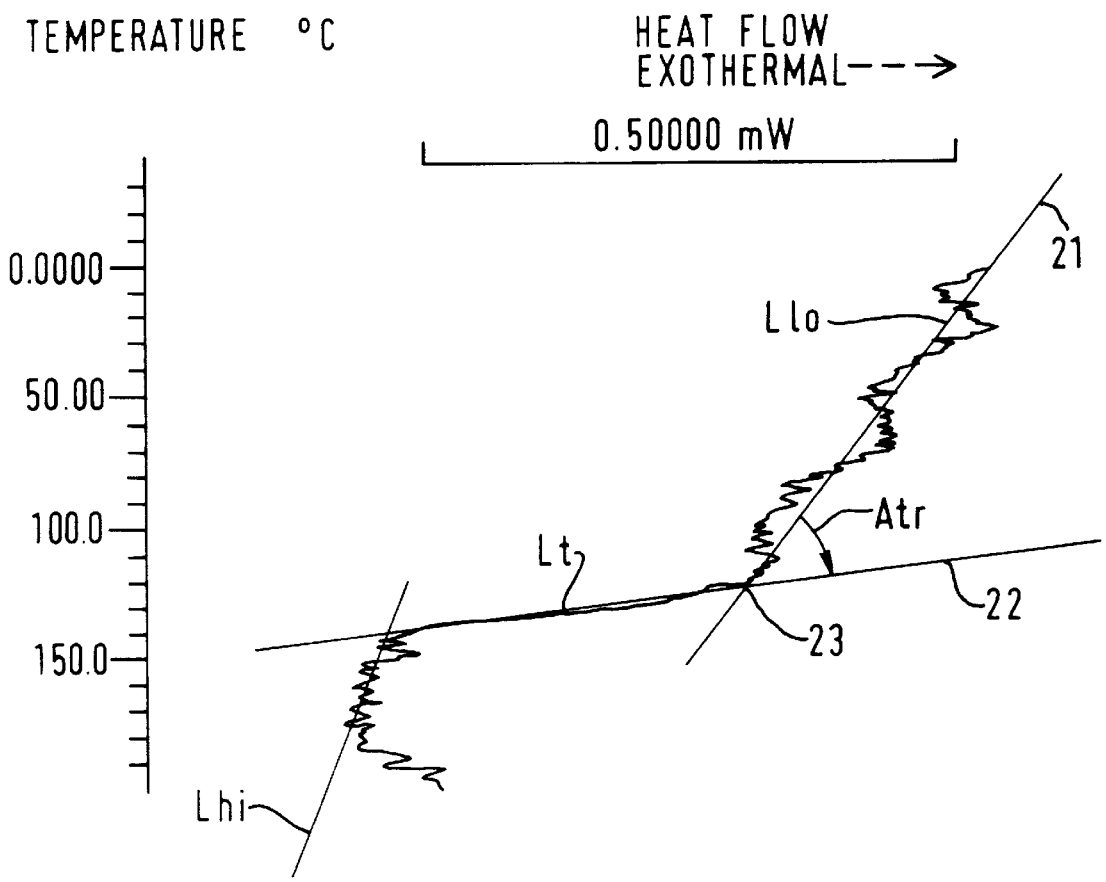

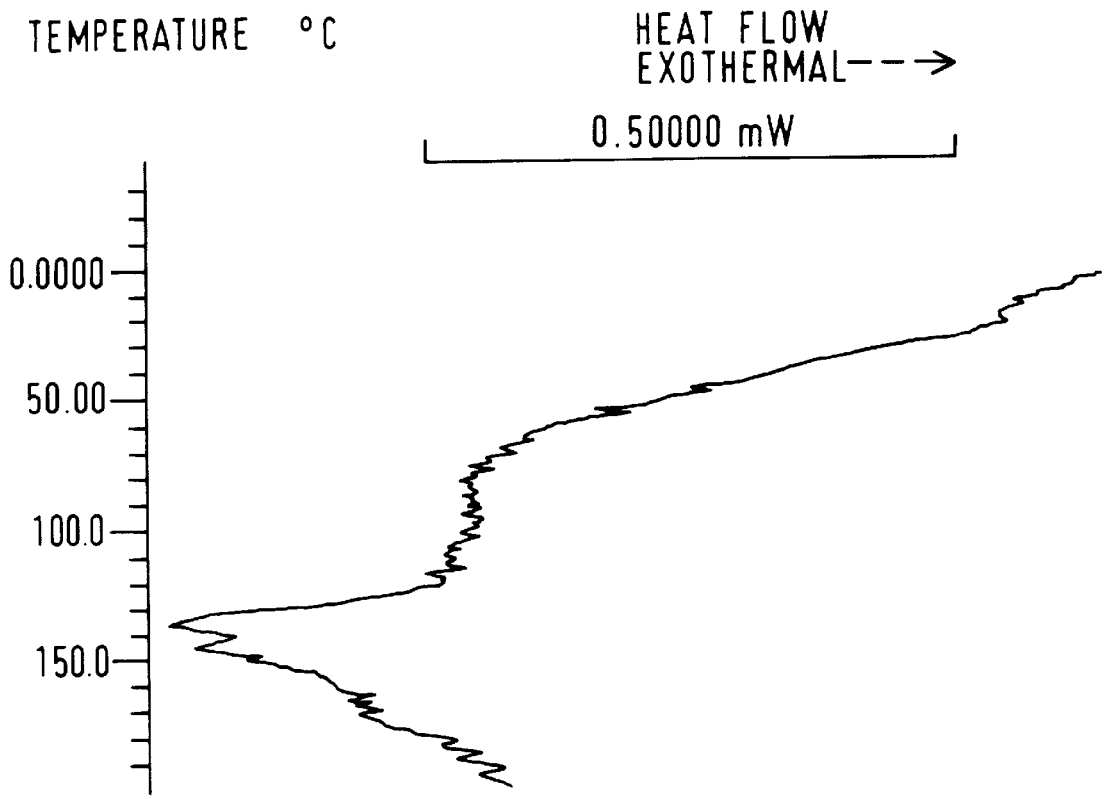
FIG. 1B1.

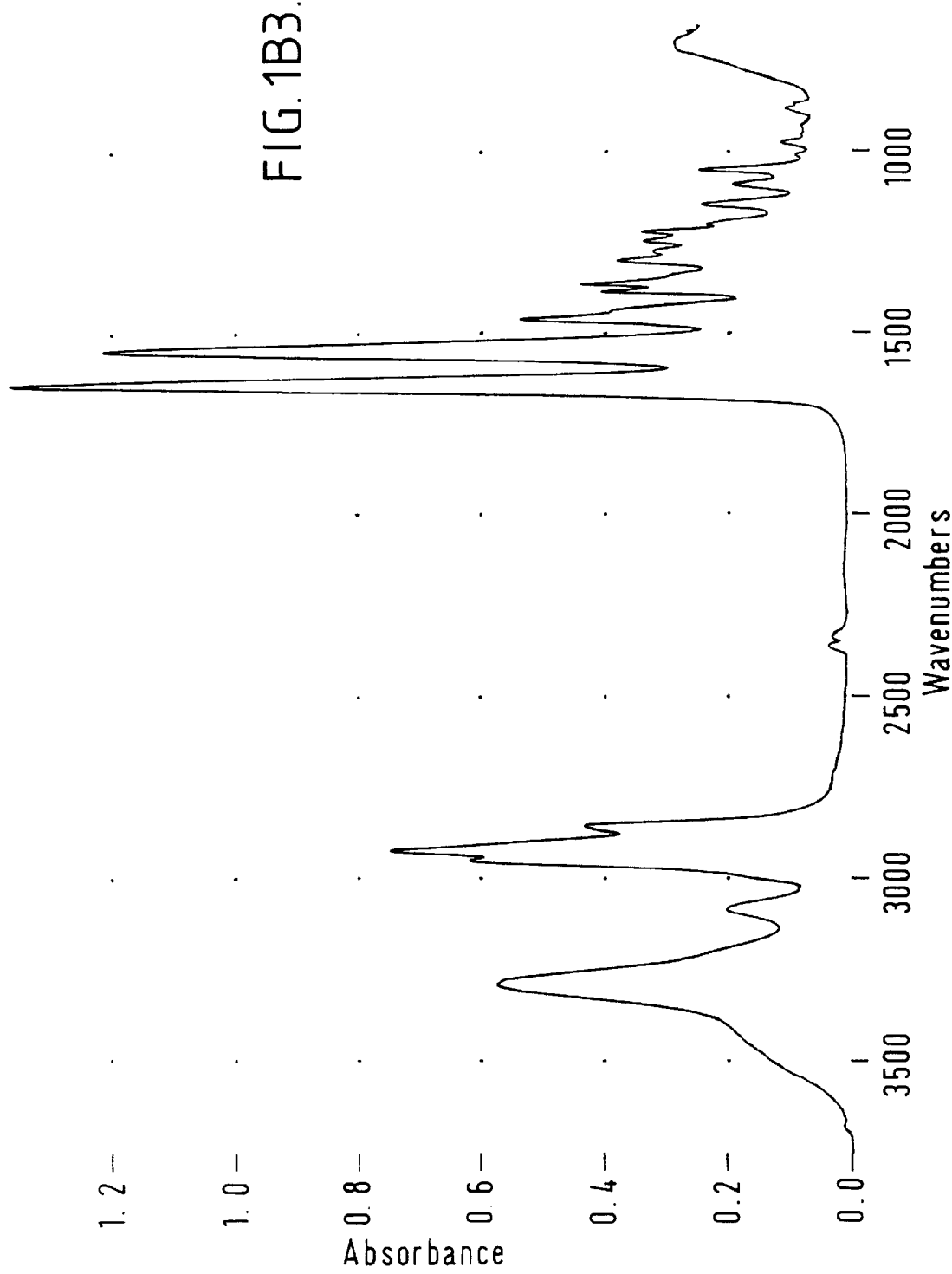

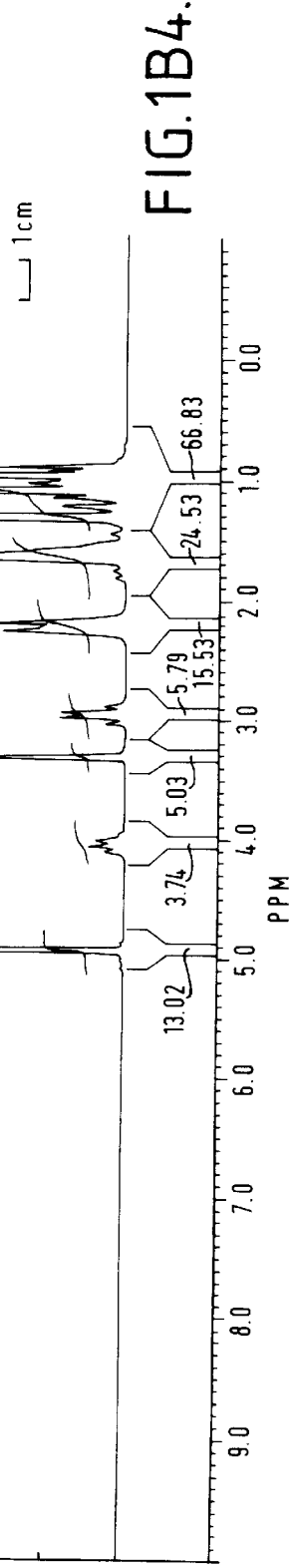

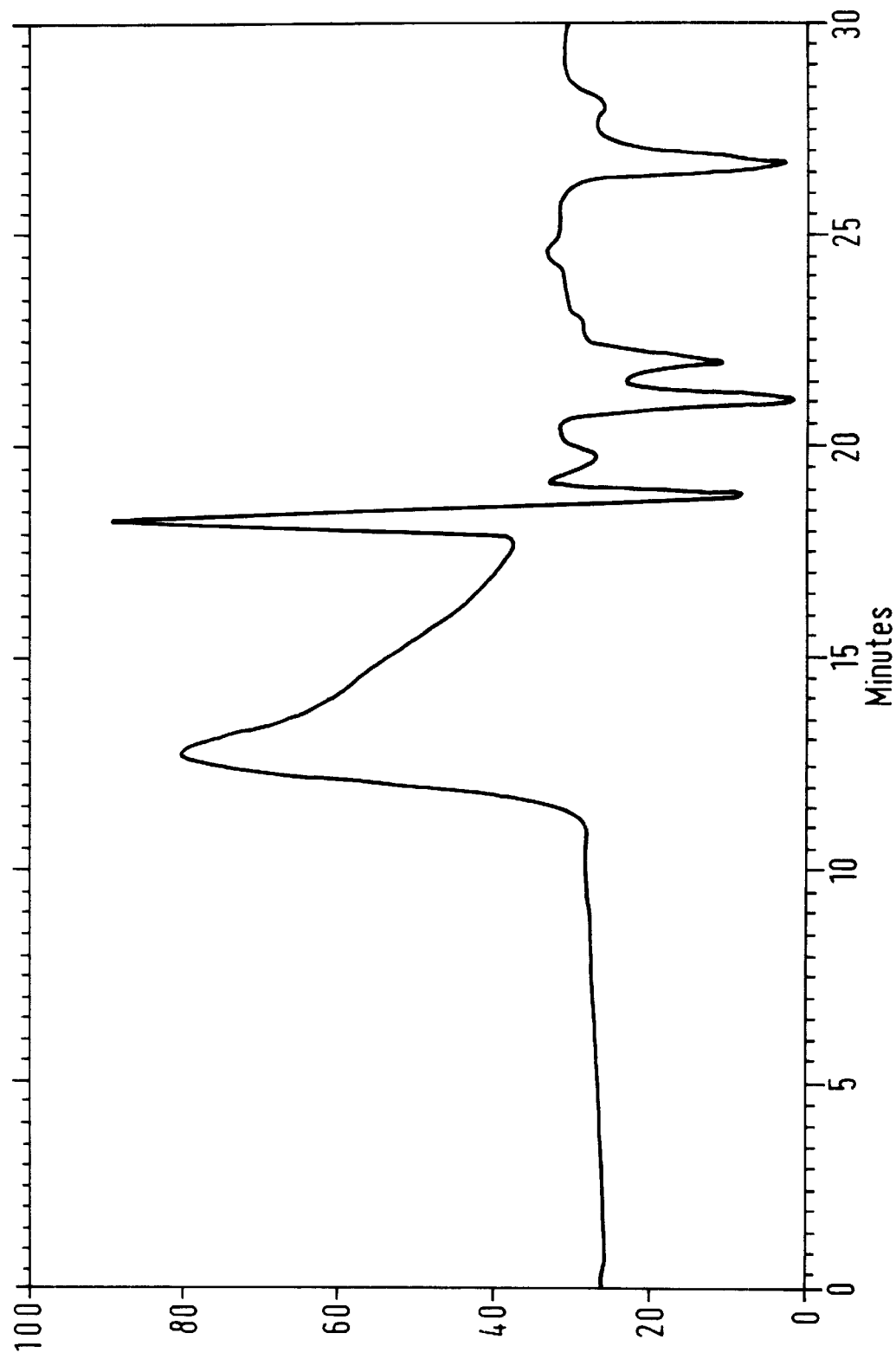
FIG.1B5.

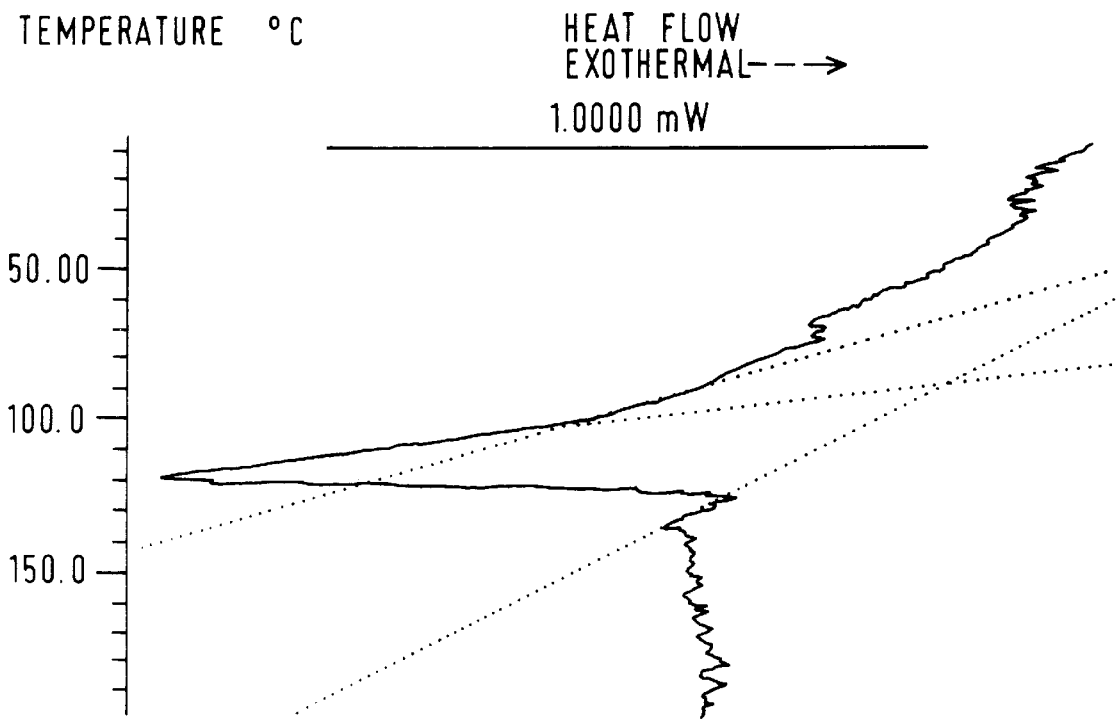
FIG. 2A2.

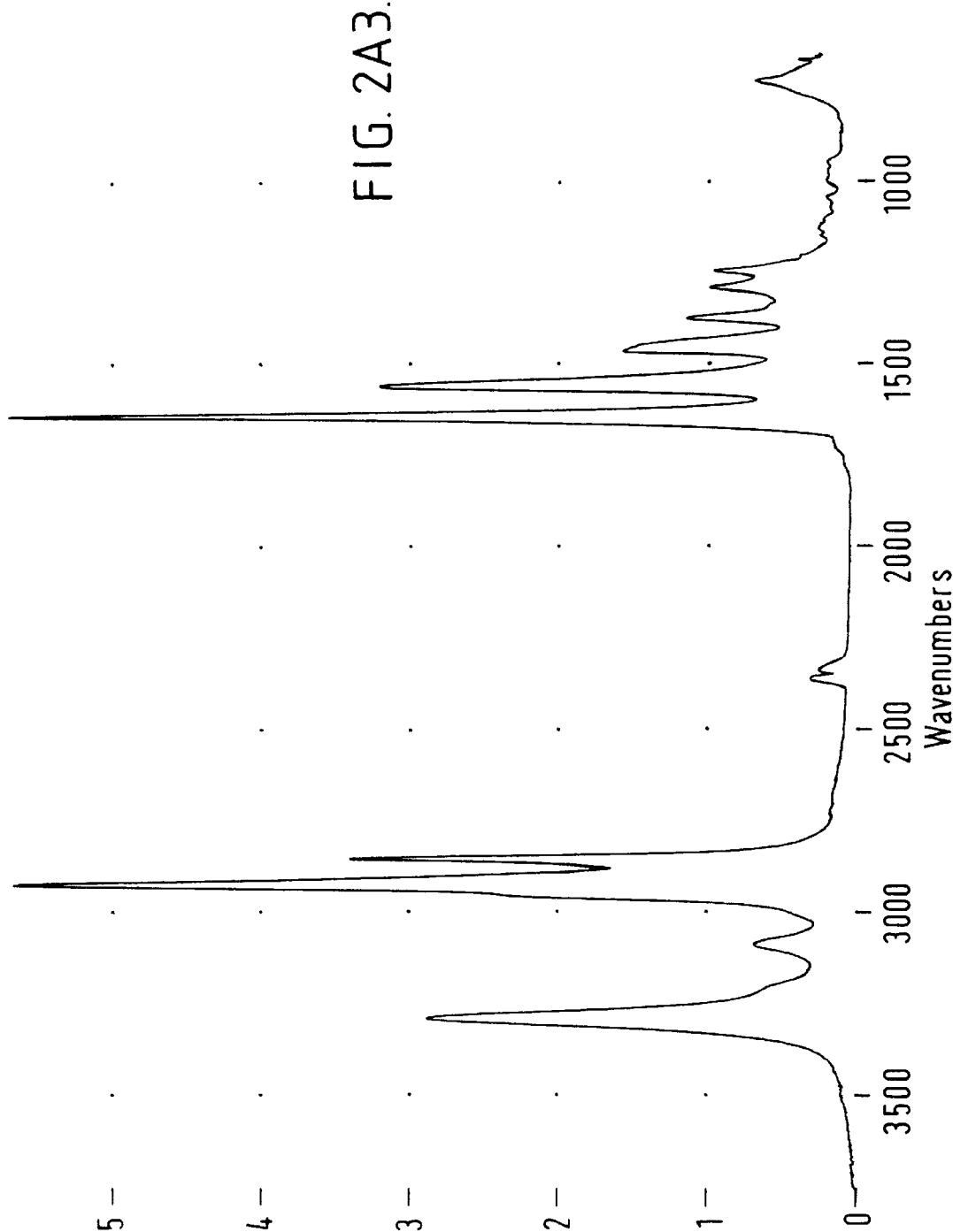
FIG. 2A3.

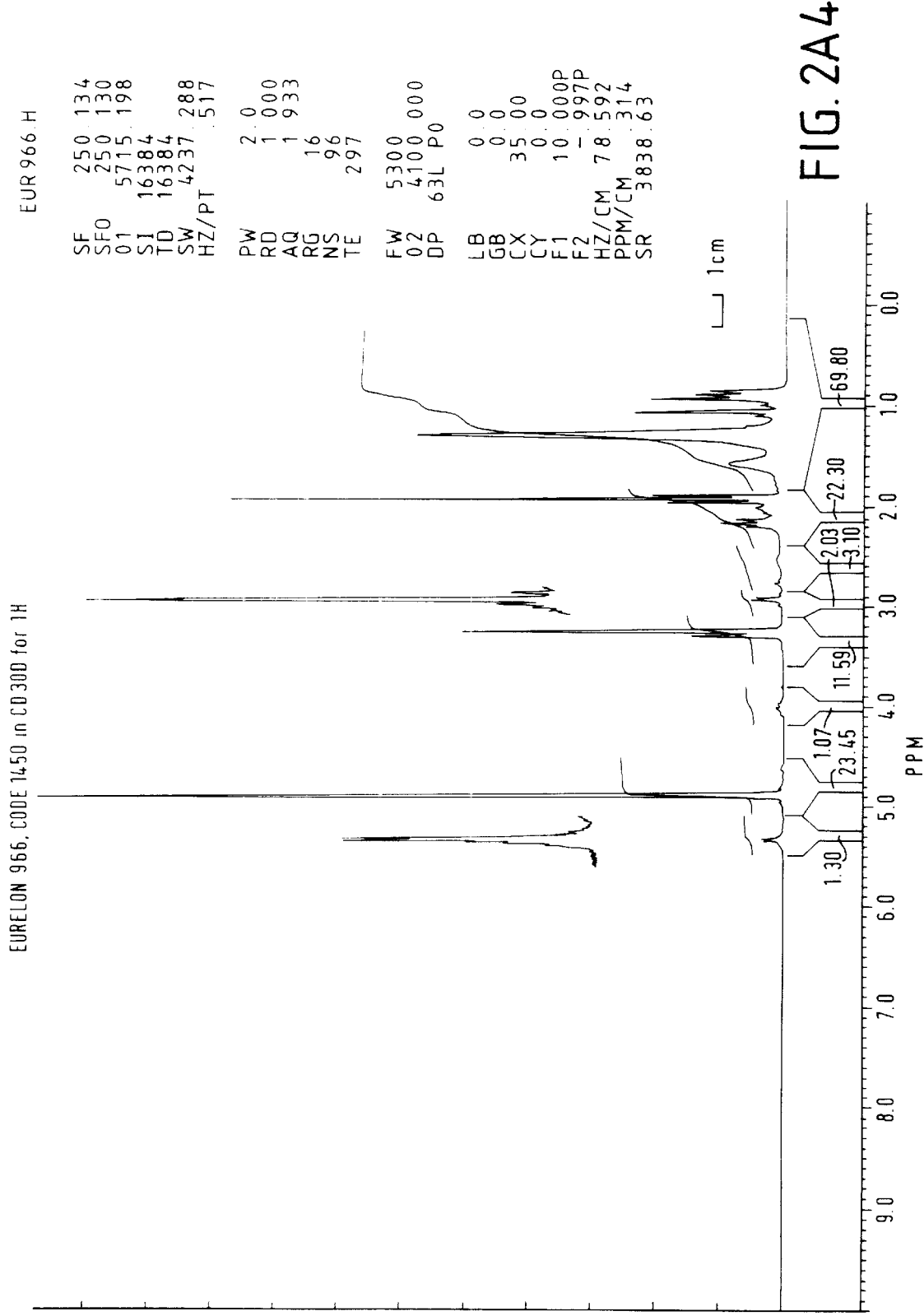
FIG. 2A4

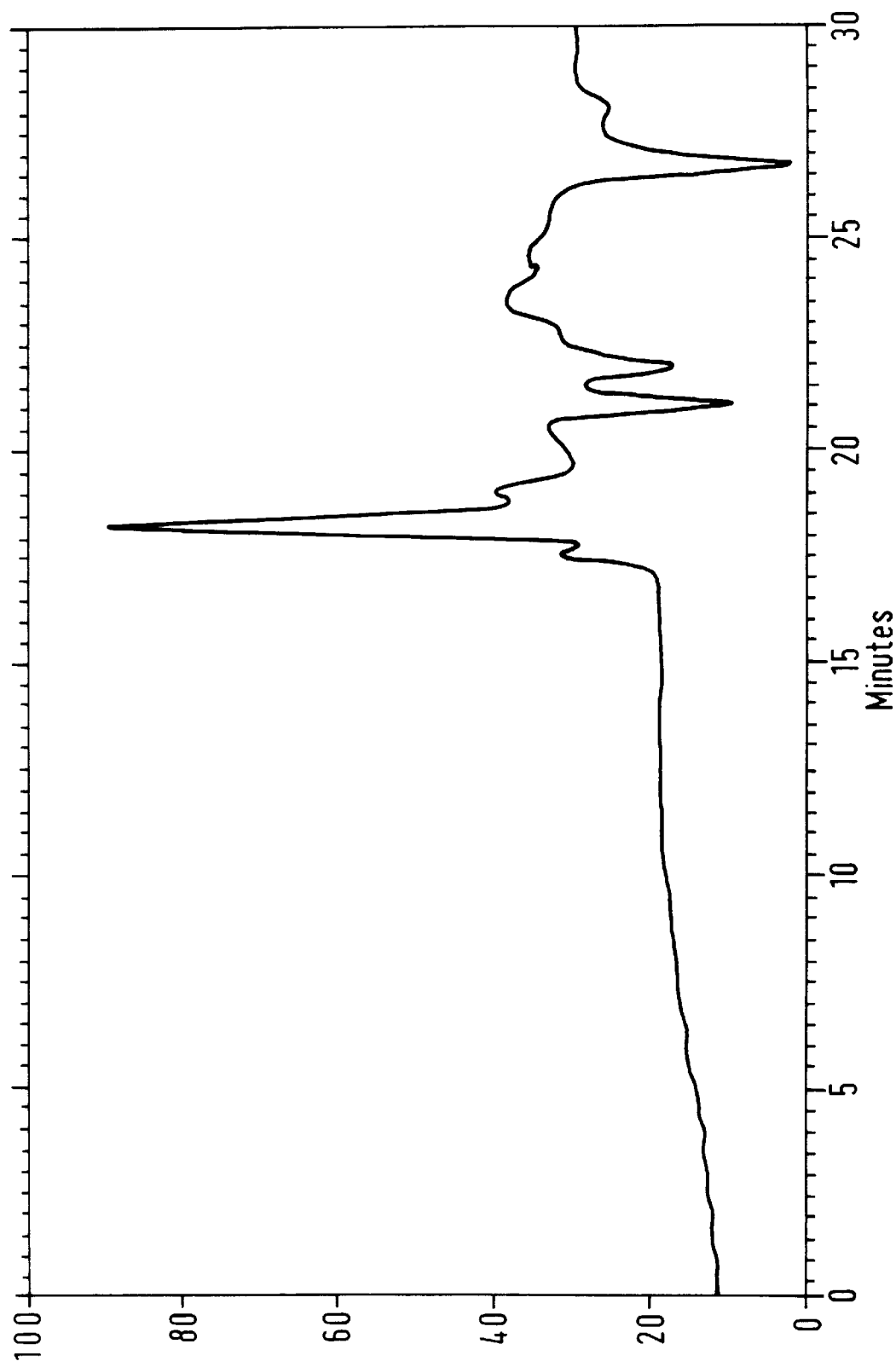
FIG. 2A5.

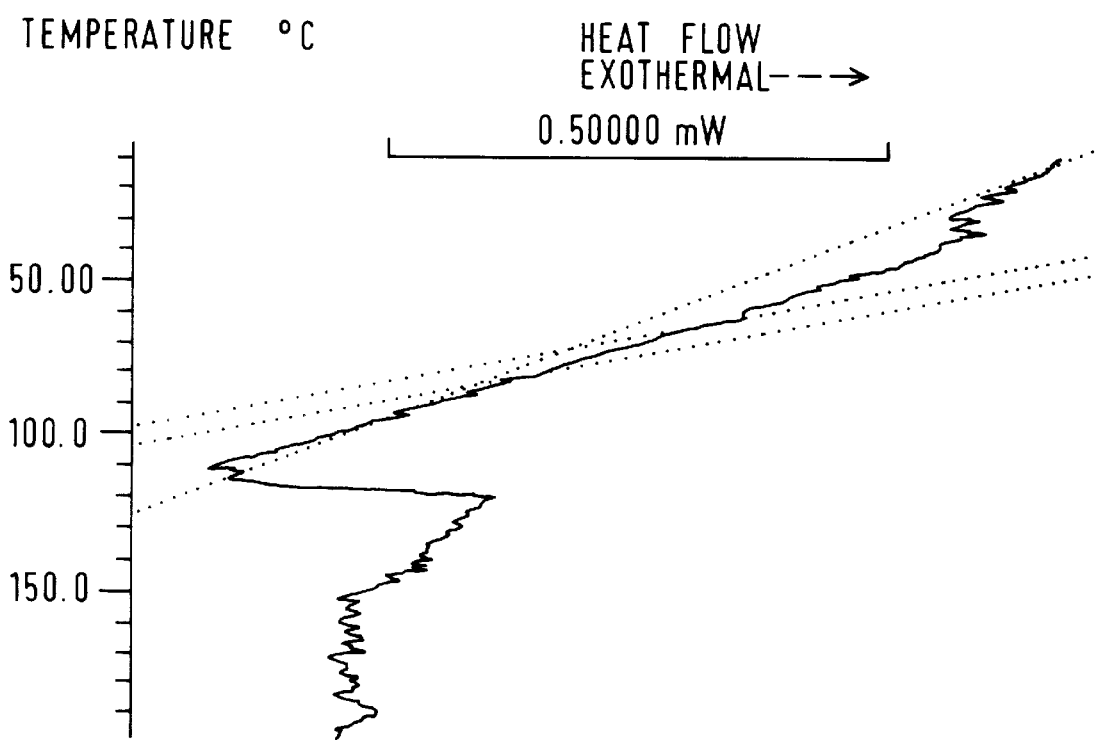
FIG. 2B2.

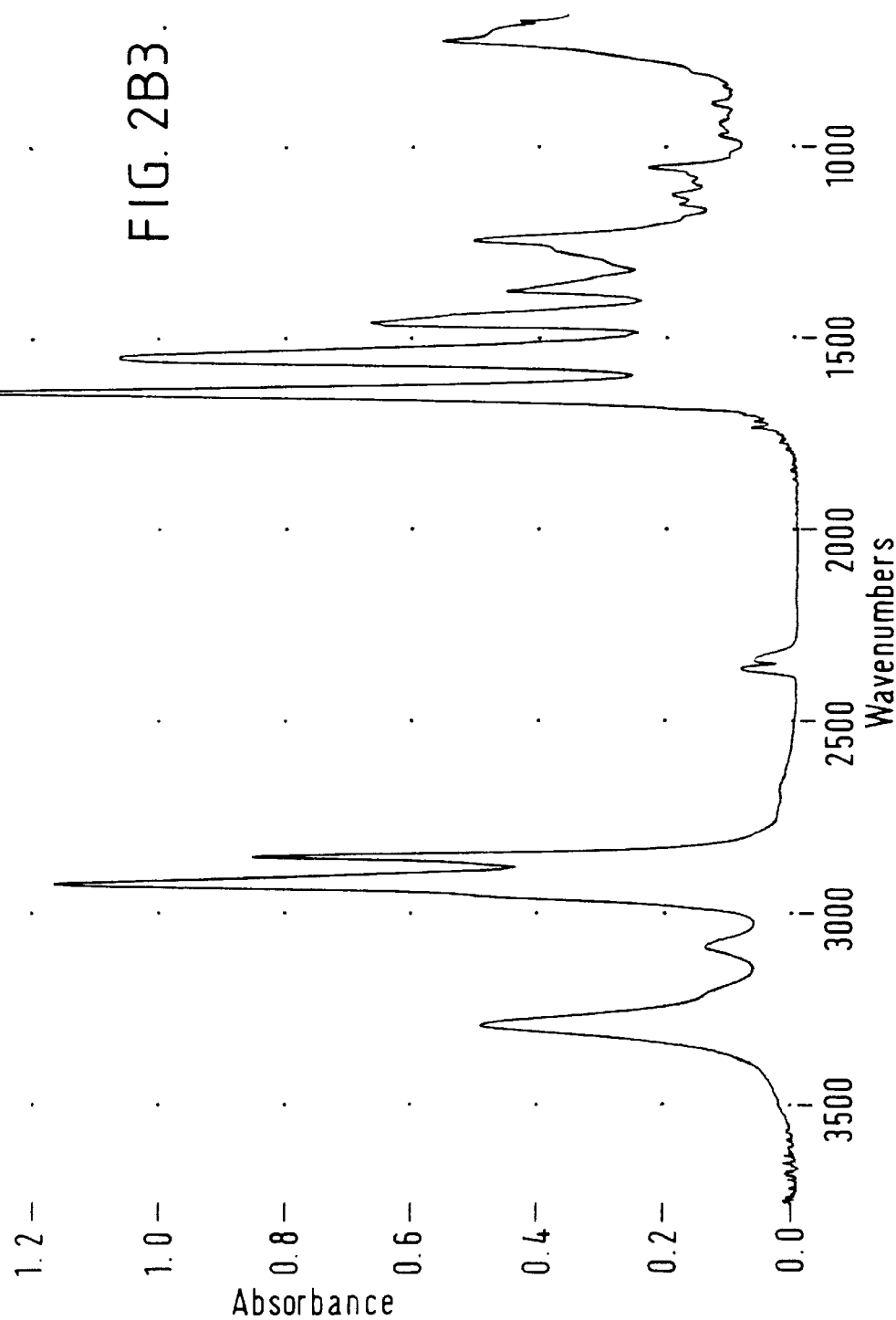
FIG. 2B3.

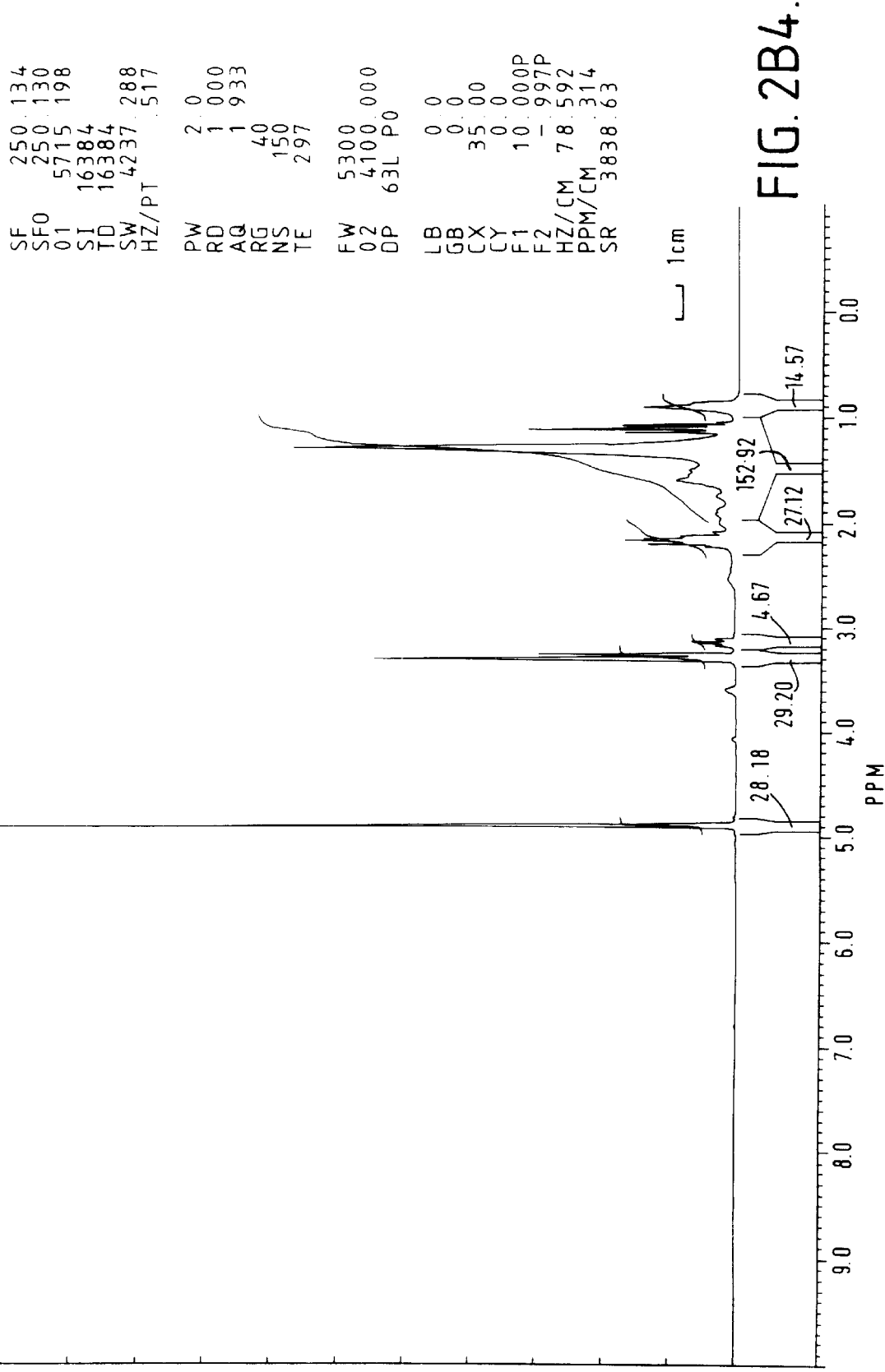
FIG. 2B4.

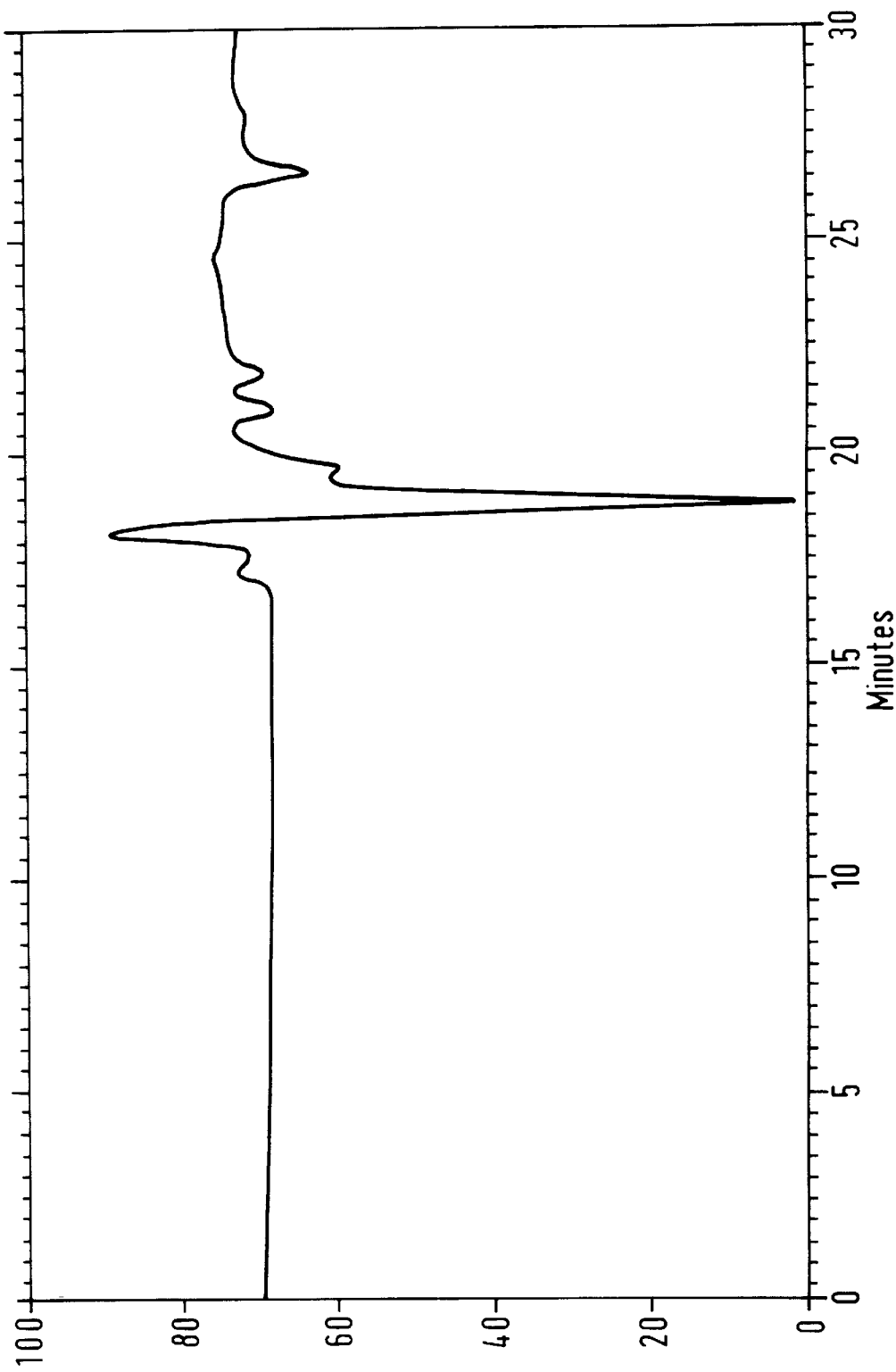
FIG. 2B5.

Figure 2C:
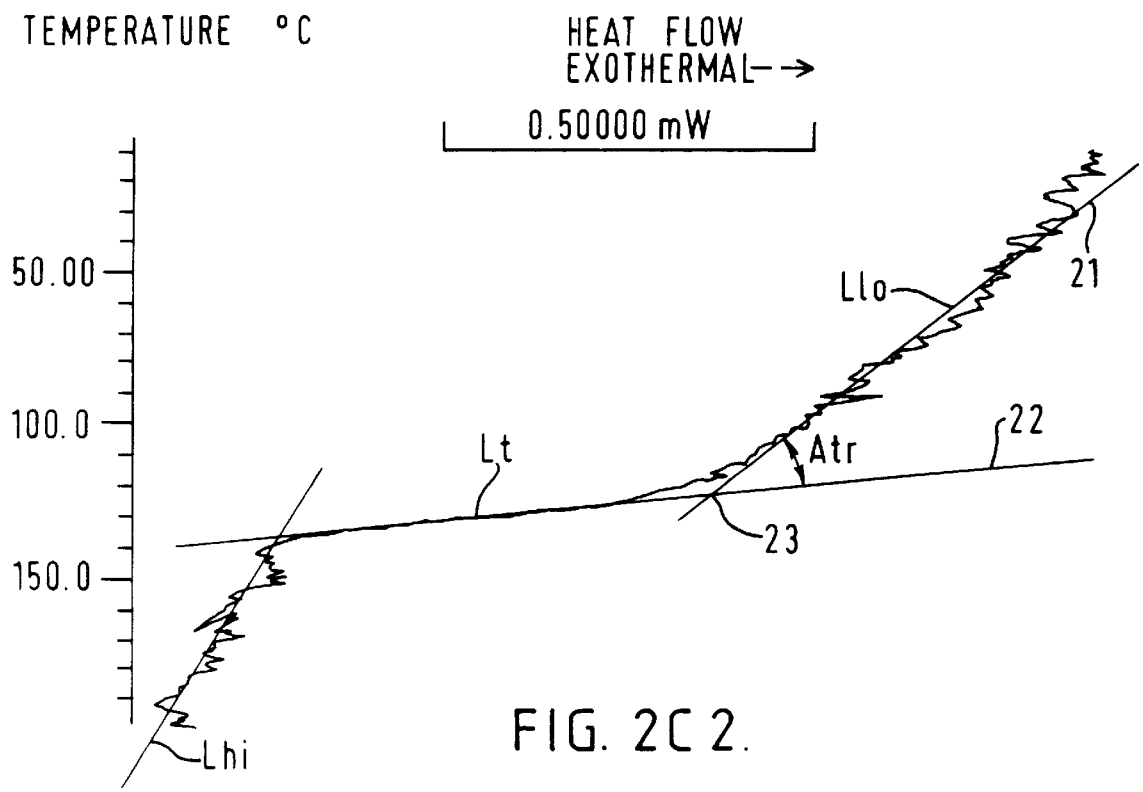

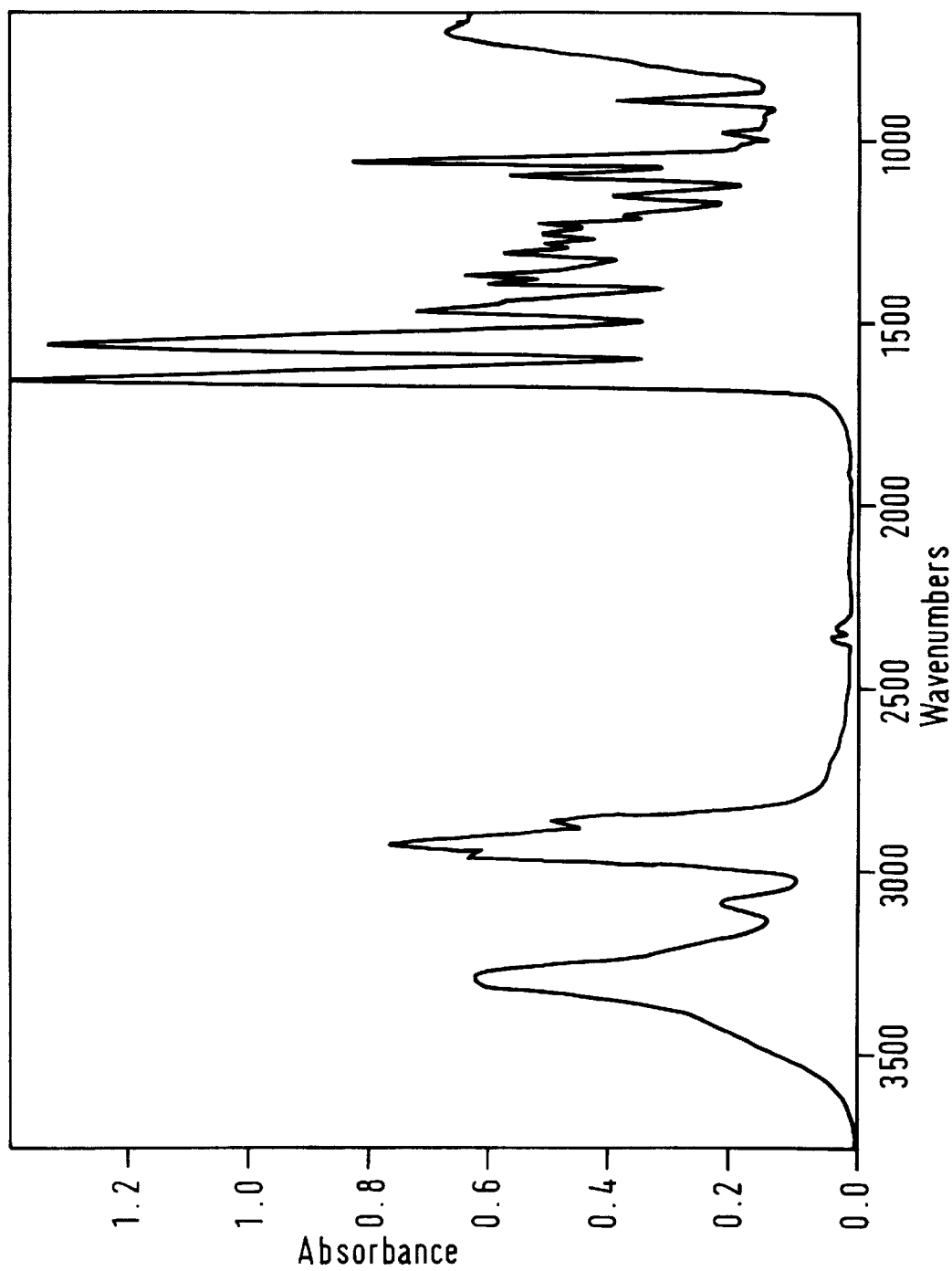
FIG. 2C3.

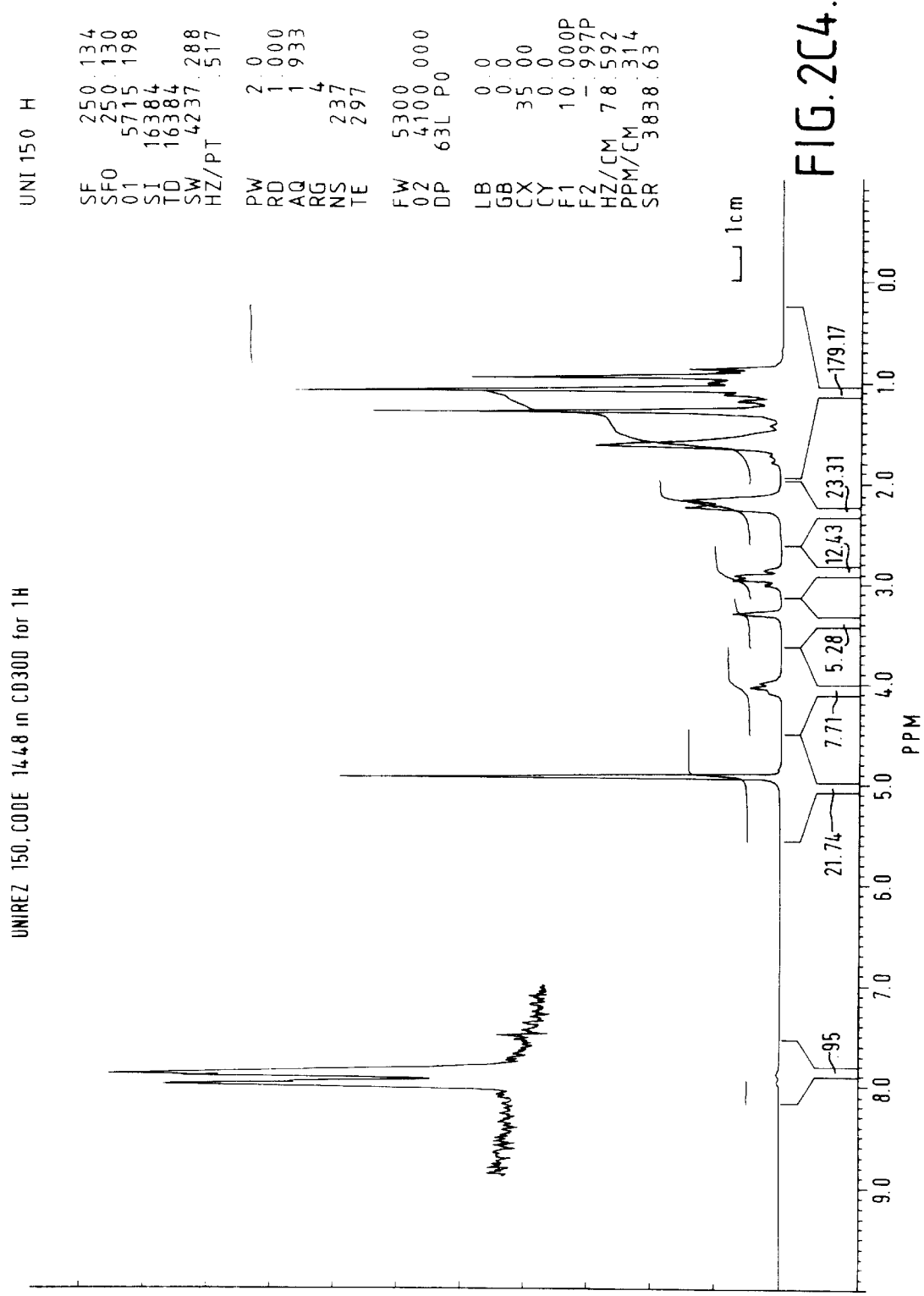
FIG. 2C4.

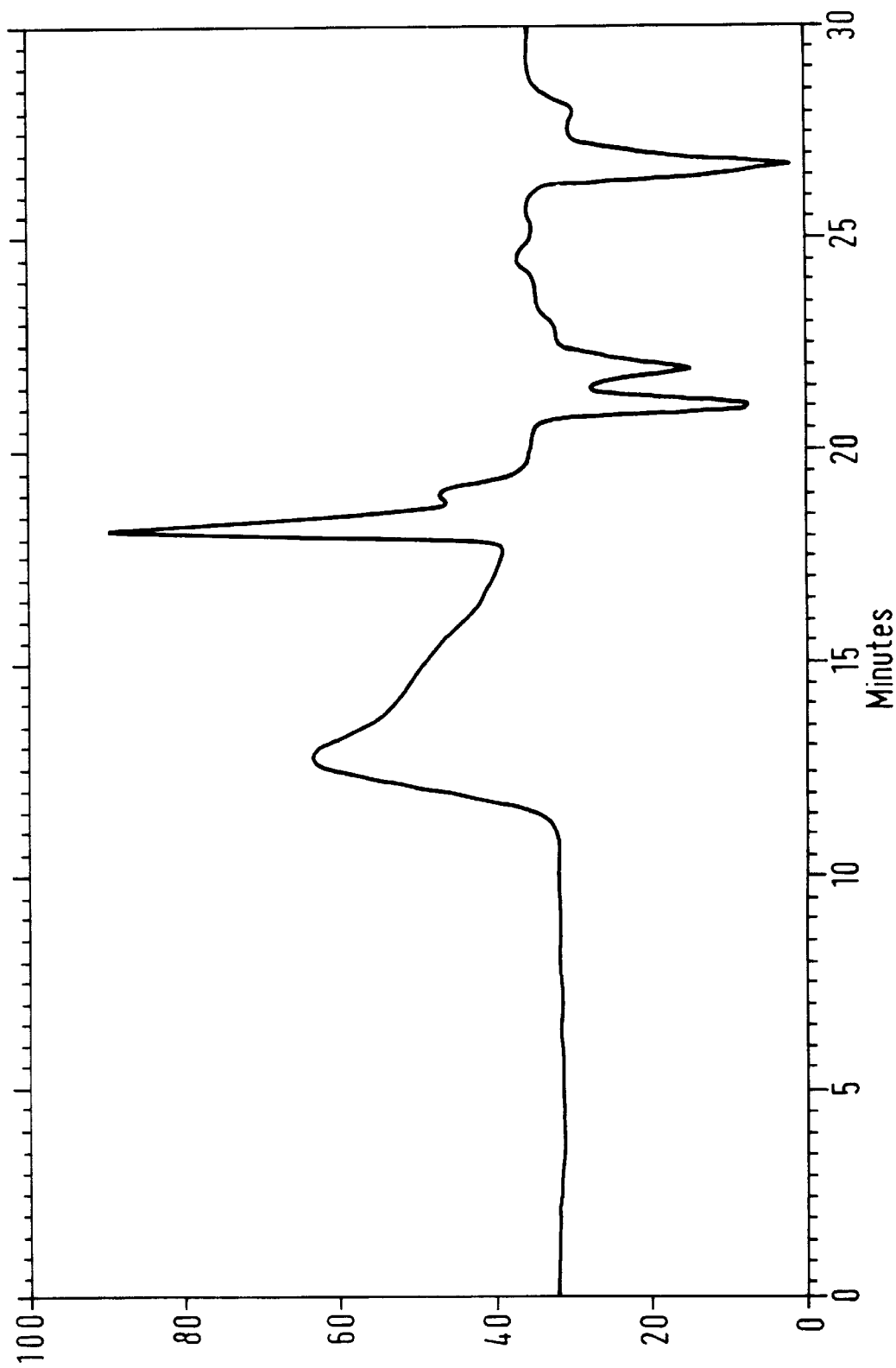
FIG. 2C5.

INK JET INKS

The present invention relates to inks for ink jet printers and especially those which operate continuously. It will be described with reference to such printers but it will be appreciated that the inks described herein may also find uses in a far wider range of less demanding applications, such as drop on demand.

An ink jet printer projects from a printer head a stream of ink droplets to impact on the substrate to be marked as the substrate is conveyed, typically at high speed, past the head. The droplets are controlled, typically electrically, so that they are deposited in a controlled array and the substrate is thereby printed with a desired indicia. Typically such indicia are code numbers and letters, dates such as "sell by" dates and other alphanumeric data, such as mail addressing. Precision is clearly essential as well as high speed.

In addition whilst the jet will be continuously operating during a printing run, the ink must also be stable physically and chemically during periods between runs.

Ink which is not deposited on the substrate is collected automatically and recycled to a return tank. To enable the ink to be applied in this way it has to have a viscosity held to close limits. In addition in order for the ink to dry or set on the substrate it is necessary for components of the ink to evaporate off from the image on the substrate. Accordingly to maintain sufficient fluidity a make up fluid has to be added to the return tank to replace lost fluids.

Typically an ink jet ink contains a colouring agent, a liquid vehicle, and a polymer. The adhesion of the polymer to the substrate and thus the adhesion of the image may be increased by adhesion promoters, such as agents effective to cross link the polymer, to form bonds between the polymer and the substrate or to do both.

In addition, where droplet formation and control is achieved electrically, it is necessary for the ink to be electrically conductive. Conductivity may be imparted by the colouring agent when this includes a charged species. If it does not impart sufficient or any conductivity this may be provided by a conductivity controller, e.g. a species ionizable in the ink, e.g. in the liquid vehicle, such as an inorganic salt or an organic salt.

The art is constantly striving to achieve deposits of sufficient durability on an increasing range of substrates. Some have concerned themselves with printing on glass or glazed ceramics (e.g. GB 1541937 and 1524881). Others have concerned themselves with polymer substrates such as acrylonitrile butadiene styrene polymers (ABS); polyolefins, such as polyethylene; polystyrene; polyvinyl chloride (PVC), plasticized or unplasticized; polyesters; and cellulose. Metal surfaces such as aluminium and stainless steel are also important substrates as are papers.

With regard to the colouring agent this has usually been related to the liquid vehicle. The colouring agents may be soluble in organic solvents e.g. methyl ethyl ketone, or $C_{1-5}$ alcohols e.g. methanol or ethanol (for example as industrial methylated spirits) or they may be soluble in alcohols mixed with water, or soluble in both alcohol and water.

Examples of colouring agents which have been advocated for use in ink jet inks are dyestuffs soluble in alcohol alone such as Basic Blue 81, Solvent Orange 7 and Solvent Blue 58. Examples which are soluble lr alcohol and water are Basic Violet 10, Acid Red 52, Acid Black 1, Acid Blue 59, Acid Red 73 and Acid Blue 9.

Triarylmethane dyes have also been advocated. Examples of these are Crystal Violet Fn (available from BASF) and Victoria Blue B base (available from Hilton Davis).

The colouring agents are employed in amounts appropriate to give the desired colour intensity in the deposit. Typically the ink contains 0.1 to 10% of the colouring agent e.g. 3 to 7% preferably 4 to 6%.

The liquid vehicle has to be such as to impart the desired fluidity (or low viscosity) to the ink but must evaporate at a high enough rate to leave the deposited image resistant to smudging soon after it is deposited. It must also be a good enough solvent to get the colouring agent and polymer intimately admixed.

Methyl ethyl ketone (MEK) has been used very effectively in commercially available ink jet formulations, as has ethyl acetate. However, these are thought to have adverse effects on the environment. It is thus desired to replace them with other liquid vehicles. Alcohols and mixtures of alcohols and water have been advocated (see GB 1541937 and 1524881).

However MEK systems give good adhesion to many substrates and evaporates rapidly giving a short smudge time—typically the deposit becomes dry and smudge free within 2 seconds.

The polymer has the function of carrying the colouring agent and adhering it to the substrate. A number of polymers have been advocated.

Acid catalysed phenol aldehyde condensation polymers of molecular weights in the range 200–2500 which are linear and relatively free of cross linking, alcohol soluble and tolerant of dilution in the water have been proposed in GB 1541937 and 1524881. Their common name is novolac resins. Polyester resins, acrylic resins e.g. styrene—(alkyl) acrylic acid copolymer resins (see GB 2053948) and polyketone resins have also been used or proposed.

Adhesion promoters have been mentioned above and one class of these materials are cross linking agents, which can be used to advantage to improve adhesion to certain substrates.

A preferred cross linking agent is one which has functional groups which can react with functional groups such as hydroxyl in the polymer which have labile acidic protons. In the presence of water or alcohol it is believed that the reactivity of these reactive groups in the polymer will be suppressed but as the water and alcohol evaporate from the deposited image it is believed that such a cross linking agent can react with these groups in the polymer and possibly in the substrate. Whether this is the true mechanism or not the effect seems to be to increase the adhesion of the deposit to the substrate.

Examples of preferred cross linking agents which are believed to operate in the above described way are transition metals coordinated with OR or acid groups. For example, the agent may have the formula $(RO)_m MX_n$ wherein M is the metal, R is an alkyl group, X is a phosphate residue, and m and n are each integers (or one, e.g. n may be zero) whose total is the oxidation state of M. M is preferably titanium.

An example of such a compound is titanium tributyl phosphate.

GB 2161817 (Tioxide) describes the production of such compounds and refers to their use as adhesion promoters in inks, mentioning photogravure and flexographic inks specifically.

Conductivity controllers which have been proposed to increase conductivity include ionizable salts such as potassium thiocyanate. An example of another inorganic salt is lithium nitrate. An example of an organic ionizable salt is tetrabutyl ammonium bromide.

These can all be used in systems where the liquid vehicle is an alcohol or alcohol water mixture.

We have conducted detailed investigations into the factors involved in drying time and adhesion. We have found that certain polymers having a Glass Transition temperature value, $T_g$, in a certain defined range exhibit drying times which are commercially acceptable in comparison to MEK based systems even when the liquid vehicle is an alcohol of lower intrinsic volatility than MEK. Thus using the same alcohol liquid vehicle composition using our specific polymers gives commercially acceptable drying times while different polymers, not having such $T_g$ values, using the same liquid vehicle do not.

According to the present invention an ink comprises a colouring agent, a liquid vehicle and a binder polymer and is characterised in that the polymer has a Glass Transition Onset temperature in the range 95° C. to 175° C., preferably 100 to 160° C. more preferably 110° C. to 150° C., especially 120° to 140° C.

The binder is preferably a polyamide.

Preferably the binder is soluble in ethanol or IMS.

Preferably the binder exhibits IR absorption bands which denote the presence of alkyl groups such as absorption at a wavenumber in the range of 2920 to 2930 and amide groups such as absorption at a wavenumber in the range of 1635 to 1645 but not aromatic groups which exhibit absorption at wavenumbers in the range of 3000 to 3200 and below 850.

According to a second aspect of the present invention an ink comprises a colouring agent, a liquid vehicle and a binder polymer and is characterised in that the polymer is a polyamide which has an IR spectrum which exhibits an absorption peak at a wavenumber in the range of 2920 to 2930 which is characteristic of the presence of alkyl groups and an absorption peak at a wavenumber in the range of 1635 to 1645 which is characteristic of the amide 1 group and in that the ratio of the absorbance of the alkyl peaks to that of the amide peaks is not greater than 0.7:1, preferably 0.01:1 to 0.7:1, more preferably 0.6:1 to 0.1:1.

The polyamide IR spectrum is preferably free of absorption peaks characteristic of an aromatic group.

A polymer which exhibits a Glass Transition is one which at lower temperatures exists in a glassy state in which the molecules have essentially no degrees of freedom and in which state (the glassy state) an amount of energy Wg is needed to raise the temperature of the material by 1° C., and which at higher temperatures exists in a less glassy state (the rubbery state), in which the molecules have some degrees of freedom and in which state the amount of energy Wr needed to raise the temperature of the material by 1° C. is less than in the glassy state.

When the difference between Wg and Wr is large this is known as a strong transition, when it is small it is called a weak transition. A plot of W, the energy needed to raise the temperature by 1° C., against temperature is essentially a straight line up to the transition, the plot then goes through an inflexion and then resumes as a straight line above the transition unless degradation occurs at higher temperatures. For the polymers of interest in this case the plot is usually carried out over a temperature range up to 200° C. The onset $T_g$ value is measured by drawing the best line (Llo) for the straight portion below the transition and the best tangent (Lt) to the inflexion, these two lines are extended until they intersect and the temperature at which they intersect is the onset $T_g$ value. The best line (Lhi) for the straight portion above the transition can also be drawn, and this line and the tangent line extended until they intersect and the temperature at which they intersect is the end $T_g$ value. The $T_g$ range ($T_gR$) is thus onset $T_g$ ($T_go$) to end $T_g$ ($T_ge$). We have found that polyamides with $T_gR$ values of 5° C. or more, e.g. 10, 15 or 20° C. are effective in the present invention.

The line Lt makes an acute angle (Atr) with the line Llo. When Atr is less than 10° the transition is called weak. We prefer Atr to be at least 20°, 25°, 30°, 35°, 40°, or more preferably at least 30°. We prefer the transition to be not a weak transition.

If the $T_go$ is less than 95° C. the drying time tends to be unacceptably long especially when the liquid vehicle is a $C_{1-5}$ alcohol e.g. ethanol or industrial methylated spirits (IMS), of which there are various grades typically containing at least 95% by weight of ethanol and balance of methanol and other denaturants.

When the $T_go$ is greater than 175° C. it may be expected that a decrease in solubility will occur making the ink unsuitable for ink jet purposes.

We have found that excellent results are obtained when the polymer is an alcohol soluble polyamide. Alcohol solubility is enhanced when the polyamide is made up of aliphatic groups and preferably these predominate in the molecule, which may indeed be fully aliphatic.

The polyamide is preferably one of which the IR spectrum exhibits an absorption peak at a wavenumber in the range of 2920 to 2930 which is characteristic of the presence of alkyl groups and an absorption peak at a wavenumber in the range of 1635 to 1645 which is characteristic of the amide 1 group and desirably does not exhibit absorption peaks characteristic of an aromatic group.

The ratio of the absorbance of the alkyl peaks to that of the amide peaks is preferably not greater than 0.7:1, or 0.6:1 and is preferably in the range 0.55:1 to 0.01:1 or more preferably 0.55:1 to 0.1:1 or 0.55:1 to 0.2:1 or 0.3:1 or 0.4:1.

The liquid vehicle is preferably a $C_{1-5}$ alcohol e.g. methanol or ethanol and especially IMS.

Preferably the polyamide is one which is soluble in ethanol at 25° C. at least to the extent that a solution of lot by weight of polyamide based on solvent and polyamide can exist at 25° C.

The colouring agent is preferably a dyestuff soluble in the liquid vehicle, preferably an alcohol soluble one, especially one soluble in IMS; however very finely divided pigments could be contemplated.

Preferred colouring agents are chrome based complex dyes such as chrome azo dyes for example Solvent Black 29. A preferred form of such chrome azo dye is Solvent Black 29 having an infra-red spectra having no significant peak in the range 1650 to 1750.

The amount of polymer based on the ink by weight is preferably in the range 2% to 20% e.g. 5% to 15% especially 7% to 12%.

The amount of colouring agent based on the ink by weight is preferably in the range 0.1% to 15% e.g. 0.5% to 10% especially 4% to 7%.

The amount of liquid vehicle is typically the balance of the composition and is typically, based on the ink by weight, in the range 65% to 95%, preferably 75 to 95%.

As mentioned above the composition may also contain an adhesion promoter. This may be a cross linking agent effective to cross link the binder polymer at least in the deposit. Desirably the polymer is chosen to be cross linkable in this way.

Preferred cross linking agents are the metal phosphate chelate type described above.

The cross linking agent may be present in an amount based on the ink by weight in the range 0.5% to 10% or more importantly in an amount, based on the polymer binder by weight, in the range 1% to 40%, e.g. 10% to 35%, especially 20% to 30%.

As mentioned above the composition may also contain a conductivity controller e.g. an ionizable compound effective to make the ink of sufficient conductivity for ink jet printing.

Typically the conductivity controller may be present in an amount based on the ink by weight in the range 0.1% to 5% e.g. 0.5% to 3%, especially 0.75% to 2%.

The invention may be put into practice in various ways and a number of specific embodiments will be described to illustrate the invention with reference to the accompanying examples, in which all amounts are in % by weight unless otherwise stated.

In addition references will be made to the accompanying drawings in which:

FIG. 1A1 is a differential scanning calorimetry (DSC) plot of the first run (the drying run) for the polyamide P4512 of Example 1A;

FIG. 1A2 is a DSC plot of the second run (the measurement run) for the polyamide P4512 of Example 1A;

FIG. 1A3 is an infra-red (IR) spectra for the polyamide P4512 of Example 1A;

FIG. 1A4 is a nuclear magnetic resonance (NMR) spectra for the polyamide P4512 of Example 1A;

FIG. 1A5 is a chromatogram (GPC) for the polyamide P4512 of Example 1A;

FIG. 1A6 is an IR spectra of Valifast 3808 the dye used in Example 1.

FIG. 1B1 is a DSC plot of the first run (the drying run) for the polyamide Eurelon 975 of Example 1B;

FIG. 1B2 is a DSC plot of the second run (the measurement run) for the polyamide Eurelon 975 of Example 1B;

FIG. 1B3 is an IR spectra for the polyamide Eurelon 975 of Example 1B;

FIG. 1B4 is an NMR spectra for the polyamide Eurelon 975 of Example 1B

FIG. 1B5 is a chromatogram produced on gel permeation chromatography (GPC) apparatus for the polyamide Eurelon 975 of Example 1B;

FIG. 2A2 is a DSC plot of the second run (the measurement run) for the polyamide Eurelon 966 of Example 2B;

FIG. 2A3 is an IR spectra for the polyamide Eurelon 966 of Example 2B;

FIG. 2A4 is an NMR spectra for the polyamide Eurelon 966 of Example 2B;

FIG. 2A5 is a chromatogram (GPC) for the polyamide Eurelon 966 of Example 2B;

FIG. 2B2 is a DSC plot of the second run (the measurement run) for the polyamide UNIREZ 126 of Example 2C;

FIG. 2B3 is an IR spectra for the polyamide UNIREZ 126 of Example 2C;

FIG. 2B4 is an NMR spectra for the polyamide UNIREZ 126 of Example 2C;

FIG. 2B5 is a chromatogram (GPC) for the polyamide UNIREZ 126 of example 2C;

FIG. 2C2 is a DSC plot of the second run (the measurement run) for the polyamide UNIREZ 150 of Example 2D;

FIG. 2C3 is an IR spectra for the polyamide UNIREZ 150 of Example 2D;

FIG. 2C4 is an NMR spectra for the polyamide UNIREZ 150 of Example 2D:

FIG. 2C5 is a chromatogram (GPC) for the polyamide UNIREZ 150 of Example 2D;

EXAMPLE 1

Inks were formulated as given in Table 1 below, which also gives certain physical properties of the inks.

TABLE I

| Ingredient | Example 1A | Example 1B |
|---|---|---|
| Colouring agent | | |
| chromium azo dye (1) | 4.3 | 5.5 |
| Liquid vehicle | | |
| IMS | 79.0 | 79.5 |
| Polymer binder | | |
| polyamide (2) | 12.7 | — |
| polyamide (3) | — | 10.0 |
| $T_g o$ | — | 125° C. |
| $T_g R$ | — | 15° C. |
| Atr | — | 45° |
| Cross linking agent | 3.2 | 4.0 |
| titanium phosphate chelate (4) | | |
| Conductivity controller | | |
| lithium nitrate | 0.8 | 1.0 |
| Properties | | |
| viscosity (5) | 6.5 | 6.4 |
| in mpa*s (centipoise) | | |
| conductivity (6) | >700 | >700 |
| µS/cm | | |
| surface tension at 25° C. (7) | 24–27 | 24–27 |
| dynes/cm | | |
| density (8) g/cm$^3$ | 0.8–0.9 | 0.8–0.9 |

Notes on Table 1
(1) This chromiurn azo dye is supplied as Valifast 3808 by ICI from Orient Chemicals, USA. Its standard name is Solvent Black 29. It is soluble in IMS. FIG. 1A6 is an intra-red spectra of Valifast 3808. It will be observed that it does not exhibit a peak in the region 1600–1750.
(2) This polyamide is supplied as polyamide P4512 by Lawter International.

DSC measurements were carried out using a METTLER DSC 30 system with a METTLER TA3000 processor using a rate of temperature rise of 5° C. per minute from −40° C. to 200° C. DSC uses two pans which are heated and the heat input required to raise each pan by the same temperature is measured and the difference in heat input required is plotted against temperature. One pan was used as the reference. The other pan contains the sample to be tested. The procedure is to do a first run to drive off solvents and other volatiles, after which the sample is allowed to cool. The heating cycle is then repeated immediately.

FIG. 1A1 is the plot of the first run and FIG. 1A2 is the plot of the second run for polyamide P4512. If a Glass Transition was occurring it would be seen from FIG. 1A2 that the plot would follow a straight base line as the temperature is increased from low values. A best straight line would be drawn for this region from 0° C. to the step change to give a base line 21. The plot would then go through a step change in the heat flow which would manifest itself in the plot as an inflexion. A best tangent to the inflexion would be drawn to give a line 22. The lines 21 and 22 would be extended until they intersected at the point 23. The point of intersection would be the $T_g$ onset value herein.

Polyamide P4512 has the following physical characteristics:

(i) an infrared (IR) spectra as shown in FIG. 1A3, with the following significant peaks-2925 wavenumber denoting the presence of alkyl groups, 1640 wavenumber, the amide 1 band, denoting the presence of amide groups. The ratio of absorbance of the alkyl peak or band to the amide peak is 1:1.

The IR spectra was carried out using attenuated total reflectance, zinc selenide crystal and an incident-angle of 45°.

(ii) a nuclear magnetic resonance (NMR) spectra as shown in FIG. 1A4, with the following significant peaks-4.9–5.0 ppm denoting the presence of amide groups, 0.8–1.8 ppm denoting the presence of alkyl groups, the peak at 1.3 ppm being characteristic of methylene and the peak at 0.9 being characteristic of methyl. Substantial peaks at 3.3 ppm and at 2.2 ppm are also present.

The NMR spectra was carried out with the system locked onto tetramethyl silane as the reference material. $^1$H nmr spectra were recorded on a Bruker AC250 spectrometer (250 MHz) after dissolving the sample in $CD_3OD$.

The polymer can be deduced to contain solely aliphatic components, see the IR and NMR spectra.

(iii) a chromatogram (GPC) as shown in FIG. 1A5.

This was carried out as described below for FIG. 1B5.

(3) This polyamide is supplied as polyamide Eurelon 975 by Witco.

It has a softening point as determined by the ball and ring method of 173° C.

It exhibits a Glass Transition and has a $T_g$ onset value of 125° C., a $T_gR$ range of 125° C. to 140° C. and an angle Atr of 45°. These properties were measured by DSC using the method described above for the P4512 polyamide. FIG. 1B1 is the plot of the first run and FIG. 1B2 is the plot of the second run for polyamide Eurelon 975. It will be seen from FIG. 1B2 that a Glass Transition has occurred. Thus the plot follows a straight base line as the temperature is increased from low values. A best straight line is drawn for this region from 0° C. to the step change to give a base line 21. The plot then goes through a step change in the heat flow which manifests itself in the plot as an inflexion. A best tangent to the inflexion is drawn to give a line 22. The lines 21 and 22 are extended until they intersect at the point 23. The point of intersection is the $T_g$ onset value herein.

Polyamide Eurelon 975 has the following physical characteristics:

(i) an infrared (IR) spectra as shown in FIG. 1B3, with the following significant peaks-2925 denoting the presence of alkyl groups, 1640, the amide 1 band, denoting the presence of amide groups.

The ratio of the absorbance of the alkyl peak or band to the amide peak is 0.54:1.

The IR spectra was carried out as above.

(ii) a nuclear magnetic resonance (NMR) spectra as shown in FIG. 1B4, with the following significant peaks-4.9 ppm denoting the presence of amide groups, 0.9 to 1.7 denoting the presence of alkyl groups, the methylene peak at 1.3 ppm and the methyl peak at 0.9 being present, but only small peaks being present in the range 2 to 4 ppm.

The NMR spectra was carried out as above.

(iii) a GPC chromatogram as shown in FIG. 1B5.

The horizontal axis is in minutes, the vertical axis is in % detector response.

The chromatogram shown in FIG. 1B5 was produced on a gel permeation chromatography column using isopropanol as the eluant. Two columns were used in series. The first was composed of PL gel 5 micrometres and had a porosity of $10^3$ Angstoms, the second was composed of PL gel 5 micrometres and had a porosity of 50 Angstroms.

The detector was a Waters 410 refractive index detector and gives an output in millivolts. This is plotted as % detector response against time in minutes since the sample was injected. The flow rate of the solvent through the column was 1.00 ml/min. The samples were prepared by dissolving in isopropanol to give a concentration of 0.25% by weight of the polymer. The samples were injected as 100 microlitre samples.

The chromatogram shows a peak at 10 to 12 minutes with a sharp lower time face and a shallow higher time face. It is suspected that this may be due to the polymer becoming absorbed onto the column in a way more characteristic of liquid chromatography than of gel permeation chromatography. However whatever the cause the effect is repeatable and appears to be characteristic of the polymer.

The chromatogram also has a sharp peak at about 17 minutes and then a more complicated pattern at higher times.

The polymer can be deduced to contain solely aliphatic components, see the IR and NMR spectra.

(4) This titanium phosphate chelate is supplied as Tilcom IA10 (Registered Trade Mark) by Tioxide Chemicals, Cleveland, U.K. as a 65% by weight solution in isopropanol.

(5) Viscosity is measured using a Brookfield Viscometer (model DV-II) with an ultra low (UL) adaptor, set to 60 r.p.m. All measurements are carried out in a thermostatically controlled water bath at 25% and ink samples are equilibrated at this temperature prior to measurement.

(6) Conductivity is measured directly using an EDT series conductivity meter (model 3 BA380) which is solvent resistant. The conductivity probe is a platinum plate (1 $cm \equiv 1m^{-1}$).

All measurements were carried out after calibration of the meter and equilibration of the ink in a water bath held at 25° C.

(7) Surface tension is measured using a torsion balance with a platinum ring at 25° C.

(8) Density is measured using a pyknometer (density bottle) at 25° C.

The inks of Example 1A and 1B were compared by applying them using the same ink jet printer with means for heating the printer head so that the droplets are held at a fixed temperature when projected onto an aluminium substrate, a polycarbonate substrate and an enamel coated steel substrate. The head was held at 25° C. The two examples were compared with a conventional ink in which the liquid vehicle was MEK and the polymer binder was a nitrocellulose which is insoluble in IMS. This conventional ink is referred to as Example 1C.

The time for the deposit to become non smudging (the drying time) is given in Table II.

TABLE II

| Substrate | Aluminium | poly-carbonate | Enamel coated steel | Adhesion (10) |
|---|---|---|---|---|
| Example | | | | |
| 1A | 1.0 (9A) | 3.5 (9B) | 4.0 (9B) | poor |
| 1B | 1.25 | 1.75 | 1.5 | excellent |
| 1C | 1 | 1 | 1 | excellent |

Note on Table II (9A) The time for the deposit to become non smudging was assessed as follows:

the image projected onto the substrate was of alphanumeric characters, the alphabet and the numbers 1–9, 3 mm high with 7 characters to the inch (2.75/cm) Each character falls within a 7×5 dot matrix and the characters are arranged in a single print line. The substrate is located 13 mm from the print head and moved past the print head at 1 metre per second. The print head has a 75 micrometre (micron) diameter nozzle. A finger is drawn across the image repeatedly at about 0.25 second intervals until the image no longer smudged. The time to the first non-smudged image was judged to be the drying time to the nearest 0.25 second.

(9B) These deposits remained tacky for longer than the recorded drying time.

(10) Adhesion was assessed by determining the scrub resistance under wet conditions of printed codes. Solid blocks were printed on the substrate, the blocks consisting of a 16×10 dot matrix 5 mm high at a density of 10 blocks in a 6 cm line. The substrate was mounted on a Sheen abrasion tester (model 903A) and abraded with the nylon brush supplied with the machine whilst wet with water. The test is considered to be failed when an area equivalent to a single block has been removed from the substrate. The test is normally carried out for up to 700 oscillations of the brush. If failure occurs before 200 cycles adhesion is poor, failure between 201 and 600 is described as good, and if no failure has occurred at 600 cycles then adhesion is excellent.

The ink of Example 1B containing the polymer with the higher $T_g$ value gives a considerably improved drying time compared to Example 1A.

These tests were then repeated for examples 1A and 1B using the same ink jet printer.

The head was heated to 50+/−3° C. and the results are given in Table III.

TABLE III

| Substrate | Aluminum | poly-carbonate | Enamel coated steel |
| --- | --- | --- | --- |
| Example | | | |
| 1A | 1.0 | 3.5 | 4.25 |
| 1B | 1.0 | 1.5 | 1.5 |

Example 1B with the higher $T_g$ onset value has much improved performance on polycarbonate and enamel coated steel compared to Example 1A. The drying times for Example 1B are competitive with those for 1C whilst those of Example 1A are not.

EXAMPLES 2A, 2B, 2C, 2D and 2E

Inks were formulated as given in Table IV below which also gives certain physical properties of the inks.

These examples demonstrate the effect of varying the onset $T_g$ value on drying time and wear properties.

TABLE IV

| | Example | | | | |
| --- | --- | --- | --- | --- | --- |
| Ingredient | 2A | 2B | 2C | 2D | 2E |
| Colouring agent | | | | | |
| Dye (1) | 5.5 | 5.5 | 5.5 | 5.5 | 5.5 |
| Liquid vehicle | | | | | |
| IMS 99 (96% ethanoi) | 83.8 | 83.5 | 83.5 | 83.5 | 83.5 |
| Polymer binder | | | | | |
| polyamide (3) | 10.0 | | | | |
| polyamide (11) | | 10.0 | | | |
| polyamide (12) | | | 10.0 | | |
| polyamide (13) | | | | 10.0 | |
| polyamide (2) | | | | | 10.0 |
| $T_g$o | 125° C. | — | — | 130° C. | — |
| $T_g$R | 15° C. | — | — | 10° C. | — |
| Atr | 45° C. | — | — | 34° C. | — |

TABLE IV-continued

| | Example | | | | |
| --- | --- | --- | --- | --- | --- |
| Ingredient | 2A | 2B | 2C | 2D | 2E |
| Cross linking agent | — | — | — | — | — |
| Conductivity controller | | | | | |
| lithium nitrate | 1.0 | 1.0 | 1.0 | 1.0 | 1.0 |
| Properties | | | | | |
| viscosity (5) | 6.2 | 2.8 | 2.9 | 6.1 | 3.6 |
| conductivity (6) | 1299 | 1757 | 1842 | 1387 | 1383 |
| surface tension (7) | 24.5 | 24.5 | 25.3 | 24.5 | 25.1 |
| density (8) | 0.8 | 0.8 | 0.8 | 0.8 | 0.8 |
| | — | — | — | — | — |
| | 0.9 | 0.9 | 0.9 | 0.9 | 0.9 |

Notes on Table IV
Notes (1) (3) and (5) to (8) are as given for Table I

(11) This polyamide is supplied as polyamide Eurelon 966 by Witco. It has a softening point as determined by the ball and ring method of 118° C. it does not exhibit a Glass Transition. An attempt to determine Glass Transition was made by DSC using the method described under note (3) above.

FIG. 2A2 is the plot of the second DSC run for polyamide (11).

Polyamide Eurelon 966 has the following physical characteristics:

(i) an infrared (IR) spectra as shown in FIG. 2A3, with the following significant peaks-2925 denoting the presence of alkyl groups, 1640, the amide 1 band, denoting the presence of amide groups.

The ratio of absorbance of the alkyl peak or band to the amide peak is 1:1.

The IR spectra was carried out as above.

(ii) a nuclear magnetic resonance (NMR) spectra as shown in FIG. 2A4, with the following significant peaks-4.9 ppm denoting the presence of amide groups, 0.9 to 2.7 denoting the presence of alkyl groups, the methylene peak at 1.3 ppm and the methyl peak at 0.9 being present. Substantial peaks at 3.3 and 1.9 ppm are also present.

The NMR spectra was carried out as described above for FIG. 1A4.

(iii) a chromatogram (GPC) as shown in FIG. 2A5. This was produced using the same conditions as described above for FIG. 1B5.

The chromatogram does not show a peak at less than 15 minutes.

The polymer can be deduced to contain solely aliphatic components, see the IR and NMR spectra.

(12) This polyamide is supplied as polyamide ULNIREZ 126 by Union Camp. It has a softening point as determined by the ball and ring method of 115° C. According to the manufacturer this polymer has a molecular weigh in the range 1600–1700.

It does not exhibit a Glass Transition. An attempt to determine Glass Transition was made by DSC using the method described under note (3) above.

FIG. 2B2 is the plot of the second DSC run for polyamide (12).

Polyamide UNIREZ 126 has the following physical characteristics:

(i) an infrared (IR) spectra as shown in FIG. 2B3, with the following significant peaks-2925 denoting the presence of alkyl groups, 1640, the amide 1 band, denoting the presence of amide groups.

The ratio of absorbance of the alkyl peak or band to the amide peak is 0.82:1.

The IR spectra was carried out as above.

(ii) a nuclear magnetic resonance (NMR) spectra as shown in FIG. 2B4, with the following significant peaks-4.9 ppm denoting the presence of amide groups, 0.9 to 1.6 ppm denoting the presence of alkyl groups, the methylene 1.3 ppm and methyl 0.9 ppm peaks being present. A substantial peak at 3.3 ppm is also present.

The NMR spectra was carried out as described above for FIG. 1A4.

(iii) a chromatogram (GPC) as shown in FIG. 2B5. This was produced using the same conditions as described above for FIG. 1B5.

The chromatogram does not show a peak at less than 15 minutes.

The polymer can be deduced to contain solely aliphatic components, see the IR and NMR spectra.

(13) This polyamide is supplied as polyamide UNIREZ 150 by Union Camp. It has a softening point as determined by the ball and ring method of 165° C. According to the manufacturer this polymer has a molecular weight in the range 1600–1700.

It exhibits a Glass Transition and has a $T_g$ onset value of 130° C., a $T_gR$ range of 130° C. to 140° C. and an angle Atr of 34° C. These properties were measured by DSC using the method described under note (3) above.

FIG. 2C2 is the plot of the second DSC run for polyamide (13). It will be seen from FIG. 2C2 that the plot follows a straight base line as the temperature is increased from low values. A best straight line is drawn for this region to give a base line 21. The plot then goes through a step change in the heat flow which manifests itself in the plot as an inflexion. A best tangent to the inflexion is drawn to give a line 22. The lines 21 and 22 are extended until they intersect at the point 23. The point of intersection is the $T_g$ onset value herein.

Polyamide UNIREZ 150 has the following physical characteristics:

(i) an infrared (IR) spectra as shown in FIG. 2C3, with the following significant peaks-2925 denoting the presence of alkyl groups, 1640, the amide 1 bond, denoting the presence of amide groups.

The ratio of absorbance of the alkyl peak or bond to the amide peak is 0.54:1.

The IR spectra was carried out as above (ii) a nuclear magnetic resonance (NMR) spectra as shown in FIG. 2C4, with the following significant peaks-4.9 ppm denoting the presence of amide groups, 0.9 to 1.7 ppm denoting the presence of alkyl groups, the methylene peak at 1.3 ppm and methyl peak at 0.9 ppm being present but only small peaks being present in the range 2 to 4 ppm.

The NMR spectra was carried out as described above for FIG. 1A4.

(iii) a chromatogram (GPC) as shown in FIG. 2C5. This was produced using the same conditions as described above for FIG. 1B5. The chromatogram shows a peak at 10–12 minutes similar in shape but not as high as that shown in FIG. 1B5. As for that polymer this effect is repeatable. The pattern at higher times is similar to that in FIG. 1B5.

The polymer can be deduced to contain solely aliphatic components, see the IR and NMR spectra.

The inks of Example 2A to 2E were compared by applying them using the same ink jet printer as for Examples 1A and 1B. The head was held at 25° C.

The time for the deposit to become non smudging (the drying time) is given in Table V.

TABLE V

| Substrate | Enamel coated Steel | Adhesion (10) (14) |
| --- | --- | --- |
| Example | | |
| 2A | 2 | excellent |
| 2B | 4 | excellent |
| 2C | 5 | excellent |
| 2D | 2 | excellent |
| 2E | 4 | excellent |

Note on Table V
(14) Adhesion was measured on orientated polypropylene film.

We claim:

1. An ink jet ink comprising a liquid vehicle 4 to 7% by weight of a coloring agent, said coloring agent being soluble in ethanol, and 7 to 12% by weight of a non-aromatic polyamide polymer, said polyamide polymer exhibiting an infrared spectrum having an alkyl peak at a wave number in the range 2920 to 2930 and an amide 1 group peak at a wave number in the range 1635 to 1645, the ratio of the absorbance of these peaks being in the range alkyl:amide of 0.55:1 to 0.3:1 and said polyamide polymer having a glass transition onset temperature of 120° to 140° C.; and said polyamide is one which is soluble in ethanol at 25° C. at least to the extent that a solution of 10% by wieght of polyamide based on solvent and polyamide can exist at 25° C.

2. An ink jet ink comprising a liquid vehicle 0.1 to 15% by weight of a coloring agent, 2 to 20% by weight of a non-aromatic polyamide polymer, said polyamide polymer exhibiting an infrared spectrum having an alkyl peak at a wave number in the range 2920 to 2930 and an amide 1 group peak at a wave number in the range 1635 to 1645, the ratio of the absorbance of these peaks being in the range alkyl:amide of 0.7:1 to 0.01:1, and said polyamide polymer having a glass transition onset temperature of 95° to 175° C.

3. The ink of claim 2 wherein the ratio alkyl:amide is 0.55:1 to 0.3:1.

4. The ink of claim 2 wherein said polyamide polymer has a glass transition onset temperature of 120° to 140° C.

5. The ink of claim 2 wherein there is 4 to 7% by weight of the coloring agent and 7 to 12% by weight of the polyamide polymer.

6. The ink of claim 4 wherein the coloring agent is soluble in ethanol.

7. The ink of claim 6 wherein the ratio alkyl:amide is 0.55:1 to 0.3:1.

8. The ink of claim 6 wherein said polyamide polymer has a glass transition onset temperature of 120° to 140° C.

9. The ink of claim 6 wherein there is 4 to 7% by weight of the coloring agent and 7 to 12% by weight of the polyamide polymer.

10. The ink of claim 7 wherein said polyamide polymer has a glass transition onset temperature of 120° to 140° C.

11. The ink of claim 8 wherein there is 4 to 7% by weight of the coloring agent and 7 to 12% by weight of the polyamide polymer.

12. The ink of claim 10 wherein there is 4 to 7% by weight of the coloring agent and 7 to 12% by weight of the polyamide polymer.

13. An ink jet ink as claimed in claim 2 wherein the ratio of the absorbance of the alkyl peaks to that of the amide peaks is in the range 0.6:1 to 0.1:1.

14. An ink jet ink as claimed in claims 9 characterised in that the polyamide is one which is soluble in ethanol at 25° C. at least to the extent that a solution of 10% by weight of polyamide based on solvent and polyamide can exist at 25° C.

15. An ink jet ink as claimed in claim 3 wherein the Glass Transition is such that the angle Atr is at least 30°.

16. An ink jet ink as claimed in claim 6 wherein the dyestuff is a chrome azo Solvent Black 29 dye having an infrared spectrum free of any significant peak in the range 1650 to 1750 wavenumbers.

\* \* \* \* \*